United States Patent
Yadav et al.

(10) Patent No.: US 12,506,145 B2
(45) Date of Patent: Dec. 23, 2025

(54) IMPROVING ZINC-MANGANESE DIOXIDE BATTERY PERFORMANCE THROUGH INTERLAYERS

(71) Applicant: URBAN ELECTRIC POWER INC., Pearl River, NY (US)

(72) Inventors: Gautam G. Yadav, Pearl River, NY (US); Jinchao Huang, Pearl River, NY (US); Xia Wei, Pearl River, NY (US); Michael Nyce, Pearl River, NY (US); Sanjoy Banerjee, Pearl River, NY (US)

(73) Assignee: URBAN ELECTRIC POWER INC., Pearl River, NY (US)

( * ) Notice: Subject to any disclaimer, the term of this patent is extended or adjusted under 35 U.S.C. 154(b) by 577 days.

(21) Appl. No.: 17/995,977

(22) PCT Filed: Apr. 16, 2021

(86) PCT No.: PCT/US2021/027794
§ 371 (c)(1),
(2) Date: Oct. 11, 2022

(87) PCT Pub. No.: WO2021/212050
PCT Pub. Date: Oct. 21, 2021

(65) Prior Publication Data
US 2023/0187623 A1 Jun. 15, 2023

Related U.S. Application Data

(60) Provisional application No. 63/011,717, filed on Apr. 17, 2020.

(51) Int. Cl.
*H01M 4/50* (2010.01)
*H01M 4/02* (2006.01)
(Continued)

(52) U.S. Cl.
CPC ............. *H01M 4/50* (2013.01); *H01M 4/366* (2013.01); *H01M 4/42* (2013.01); *H01M 4/622* (2013.01);
(Continued)

(58) Field of Classification Search
CPC .......... H01M 4/50; H01M 4/366; H01M 4/42; H01M 4/622; H01M 4/625;
(Continued)

(56) References Cited

U.S. PATENT DOCUMENTS

| | | | | |
|---|---|---|---|---|
| 5,162,169 A | * | 11/1992 | Tomantschger | ...... H01M 10/52 429/59 |
| 5,300,371 A | * | 4/1994 | Tomantschger | ...... H01M 4/625 429/232 |

(Continued)

FOREIGN PATENT DOCUMENTS

| | | |
|---|---|---|
| WO | WO2019018636 A1 | 1/2019 |
| WO | WO2019133822 A1 | 7/2019 |
| WO | WO2021212050 A1 | 10/2021 |

OTHER PUBLICATIONS

Su et al., Lithium-sulphur batteries with a microporous carbon paper as a bifunctional interlayer, 2012, Nature Commun., 3, 1166 (Year: 2019).*

(Continued)

*Primary Examiner* — Daniel S Gatewood
(74) *Attorney, Agent, or Firm* — Andrew M. Metrailer; Conley Rose, P.C.

(57) ABSTRACT

A primary or rechargeable battery comprising a battery housing; a cathode comprising a cathode electroactive material a conductive carbon, and a binder; an anode comprising an anode electroactive material; an electrolyte; and a conductive interlayer; and wherein the cathode, the anode, the electrolyte, and the conductive interlayer are disposed (Continued)

within the battery housing. The cathode electroactive material comprises manganese dioxide, any polymorphs thereof, or combinations thereof. The cathode is configured to access 20-100% of $1^{st}$ electron capacity of the cathode electroactive material. The conductive interlayer contacts the cathode. The conductive interlayer comprises (i) a binder and (ii) a conductive carbon, a metal hydroxide, a metal oxide, or combinations thereof.

32 Claims, 9 Drawing Sheets

(51) Int. Cl.
*H01M 4/36* (2006.01)
*H01M 4/42* (2006.01)
*H01M 4/62* (2006.01)
*H01M 10/42* (2006.01)
*H01M 10/44* (2006.01)
*H01M 50/414* (2021.01)

(52) U.S. Cl.
CPC ....... *H01M 4/625* (2013.01); *H01M 10/4235* (2013.01); *H01M 10/44* (2013.01); *H01M 50/414* (2021.01); *H01M 2004/027* (2013.01); *H01M 2004/028* (2013.01); *H01M 2300/0014* (2013.01)

(58) Field of Classification Search
CPC ............. H01M 10/4235; H01M 10/44; H01M 50/414; H01M 2004/027; H01M 2004/028; H01M 2300/0014; H01M 4/06; H01M 4/24; H01M 6/04; H01M 10/28; H01M 4/75; H01M 4/62; Y02E 60/10
See application file for complete search history.

(56) References Cited

U.S. PATENT DOCUMENTS

2017/0110765 A1* 4/2017 Yadav ..................... H01M 4/50
2019/0088915 A1* 3/2019 Huang ................. H01M 4/244

OTHER PUBLICATIONS

International Search Report and Written Opinion, dated Jul. 12, 2021, PCT/US2021/027794, filed on Apr. 16, 2021.
International Preliminary Report on Patentability, dated Oct. 27, 2022, PCT/US2021/027794, filed on Apr. 16, 2021.

* cited by examiner 1, 4 - Current Collector

2 - Cathode Material

8 - Conductive Interlayer

9 - Separator

5 - Anode Material

IMPROVING ZINC-MANGANESE DIOXIDE BATTERY PERFORMANCE THROUGH INTERLAYERS

CROSS-REFERENCE TO RELATED APPLICATIONS

This application is a filing under 35 U.S.C. 371 as the National Stage of International Application No. PCT/US2021/027794, filed on Apr. 16, 2021, entitled, "IMPROVING ZINC-MANGANESE DIOXIDE BATTERY PERFORMANCE THROUGH INTERLAYERS." which claims the benefit of and claims priority to U.S. Provisional Application No. 63/011,717 filed on Apr. 17, 2020 and entitled, "Zn—MnO2 BATTERY PERFORMANCE THROUGH INTERLAYERS," both of which are incorporated herein by reference in their entirety for all purposes.

STATEMENT REGARDING GOVERNMENTALLY SPONSORED RESEARCH OR DEVELOPMENT

None.

BACKGROUND

Zinc (Zn)-manganese dioxide ($MnO_2$) batteries ($MnO_2|Zn$ batteries) are used as primary batteries for many applications. The one-time discharge of these batteries generally results in non-conductive and inactive phases that lead to a degradation in capacity and irreversibility of the main active components, primarily manganese dioxide. The primary batteries suffer from poor utilization and secondary batteries are impractical due to the presence of inactive materials. Secondary batteries are usually made rechargeable by limiting the depth of discharge (DOD) or utilization of the manganese dioxide active material. Manganese dioxide has a theoretical capacity of 617 mAh/g delivered through its two electron reactions. A single electron reaction delivers around 310 mAh/g. In $MnO_2|Zn$ rechargeable batteries, the DOD of $MnO_2$ is curtailed to about 5-10% of the 310 mAh/g ($1^{st}$ electron capacity). This reduction in capacity results in a low energy dense cell.

$MnO_2$ irreversibility in $MnO_2|Zn$ batteries has primarily been due to the formation of hausmannite ($Mn_3O_4$) and the reaction of dissolved zinc ions with manganese ions that forms haeterolite ($ZnMn_2O_4$). Manganese dissolution in alkaline electrolyte has been another contributing factor to the loss of capacity. $Mn_3O_4$ and $ZnMn_2O_4$ are resistive compounds and electrochemically irreversible; and these compounds are responsible for loss in capacity and voltage in the battery. $Mn_3O_4$ and $ZnMn_2O_4$ are conventionally formed when the DOD or utilization of $MnO_2$ is greater than 20% of $2^{nd}$ electron capacity. These problems arise in the $MnO_2|Zn$ batteries irrespective of the polymorph of $MnO_2$ used. Therefore, increasing the conductivity, preventing manganese dissolution and blocking of zinc are essential in obtaining energy dense primary and secondary cells.

The Zn electrode in the $MnO_2|Zn$ batteries suffers from poor plating efficiency in the operating voltage window of the batteries, which are usually between 1 to 1.65 V for the $1^{st}$ electron capacity. Operating at voltage ranges outside this operating window results in the dissolution of manganese ions in the electrolyte, which in turn results in the loss of active ions from the electrode. However, limiting the operating voltage below 1.65 V results in poor plating and de-plating efficiency of the Zn ions, which further lead to the failure of the Zn anode. Therefore, it is essential to design $MnO_2|Zn$ batteries that can operate at constant current conditions and beyond 1.65 V to reduce Zn anode failure. An ongoing need exists for batteries that display an increase in conductivity when compared to conventional batteries, as well as encompass preventing manganese dissolution and blocking of zinc in order to obtain energy dense primary and secondary cells.

SUMMARY

In some embodiments, a primary or rechargeable battery comprises a battery housing; a cathode comprising a cathode electroactive material a conductive carbon, and a binder; an anode comprising an anode electroactive material; an electrolyte; and a conductive interlayer; and wherein the cathode, the anode, the electrolyte, and the conductive interlayer are disposed within the battery housing. The cathode electroactive material comprises manganese dioxide, any polymorphs thereof, or combinations thereof. The cathode is configured to access 20-100% of 1st electron capacity of the cathode electroactive material. The conductive interlayer contacts the cathode. The conductive interlayer comprises (i) a binder and (ii) a conductive carbon, a metal hydroxide, a metal oxide, or combinations thereof.

In some embodiments, a primary or rechargeable battery comprises a battery housing; a cathode comprising a cathode electroactive material, a conductive carbon coated with a metallic layer, a binder, and an additive and/or dopant; an anode comprising an anode electroactive material; an electrolyte; and a conductive interlayer; and wherein the cathode, the anode, the electrolyte, and the conductive interlayer are disposed within the battery housing. The cathode electroactive material comprises manganese dioxide, any polymorphs thereof, or combinations thereof. The additive and/or dopant comprises bismuth, a bismuth compound, copper, a copper compound, or any combination thereof. The cathode is configured to access 50-100% of $2^{nd}$ electron capacity of the cathode electroactive material. The conductive interlayer contacts the cathode. The conductive interlayer comprises (i) a binder and (ii) a conductive carbon, a metal hydroxide, a metal oxide, or combinations thereof.

These and other features will be more clearly understood from the following detailed description taken in conjunction with the accompanying claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DESCRIPTION

Figure 1A:
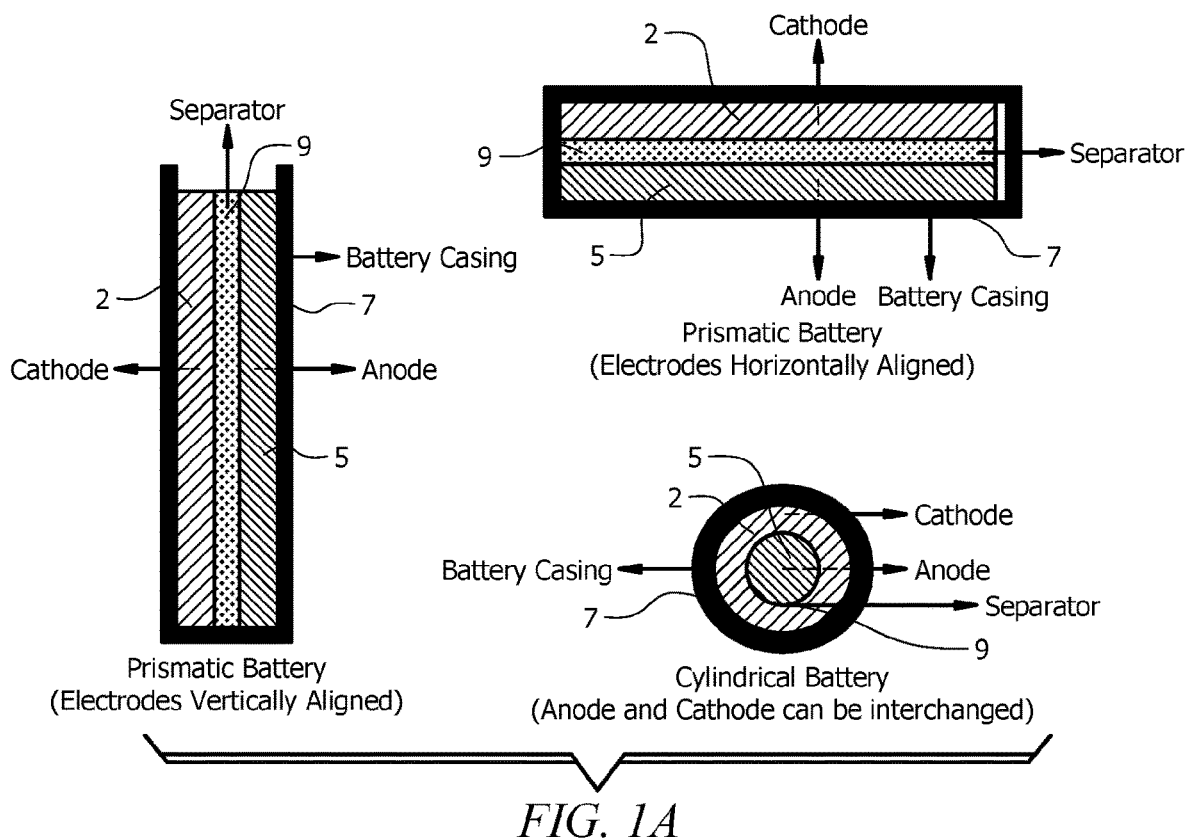
FIG. 1A-1D illustrate schematic drawings of a manganese dioxide ($MnO_2$)|zinc (Zn) ($MnO_2|Zn$) battery according to some embodiments.

In this disclosure, the terms "negative electrode" and "anode" are both used to mean "negative electrode." Likewise, the terms "positive electrode" and "cathode" are both used to mean "positive electrode." Reference to an "electrode" alone can refer to the anode, cathode, or both. Reference to the term "primary battery" (e.g., "primary battery," "primary electrochemical cell," or "primary cell"), refers to a cell or battery that after a single discharge is disposed of and replaced. Reference to the term "secondary battery" (e.g., "secondary battery," "secondary electrochemical cell," or "secondary cell"), refers to a cell or battery that can be recharged one or more times and reused. As used herein, a "catholyte" refers to an electrolyte solution in contact with the cathode without being in direct contact with the anode, and an "anolyte" refers to an electrolyte solution in contact with the anode without being in direct contact with the cathode. The term electrolyte alone can refer to the catholyte, the anolyte, or an electrolyte in direct contact with both the anode and the cathode.

Energy storage systems like batteries are required for a range of applications like grid-based, electric vehicles, solar storage, uninterruptible power sources, etc. Lithium-ion and lead acid batteries currently dominate the market; however, they are expensive, flammable and contain toxic elements. Aqueous based metal anode systems like zinc (Zn)-anode batteries can compete with lithium and lead on volumetric and gravimetric energy densities when paired with a cheap and abundant material cathode like manganese dioxide (MnO$_2$).

In order for primary and secondary manganese dioxide (MnO$_2$)|zinc (Zn) (MnO$_2$|Zn) batteries to be commercially viable and competitive with other battery storage technologies, attaining 20-30% of the $1^{st}$ electron capacity or 50-100% of the 617 mAh/g ($2^{nd}$ electron capacity) is paramount. The attainment of the $1^{st}$ electron capacity and $2^{nd}$ electron capacity is dependent on the polymorph of manganese dioxide used. Electrolytic manganese dioxide (EMD) is the most common MnO$_2$ used in MnO$_2$|Zn chemistries. EMD is capable of delivering the $2^{nd}$ electron capacity on a single discharge; however, on recharge of the discharged material the birnessite polymorph of manganese dioxide is formed. Birnessite is a resistive phase of MnO$_2$, which suffers from inactivity; however, it is the only phase of MnO$_2$ that is capable of delivering 50-100% of 617 mAh/g rechargeably. The rechargeability of birnessite's will be discussed in more detail later herein. Therefore, depending on the type of application, either phase of EMD or birnessite could be used. Both phases (EMD and/or birnessite) are suitable for primary battery applications. EMD is able to maintain its phase within the $1^{st}$ electron reaction; therefore, it is ideal to use EMD for rechargeable $1^{st}$ electron technology, as it provides better voltage curves. Birnessite is capable of delivering the $2^{nd}$ electron capacity and therefore, it is advantageous to be used for $2^{nd}$ electron technology. The mention of only these phases does not preclude the use of other polymorphs of MnO$_2$. Alpha, beta, gamma, epsilon, ramsdellite and lambda variations of MnO$_2$ can also be used as cathode materials for Zn—MnO$_2$ batteries for alkaline and acidic systems.

Manganese dioxide having high depth of discharge (DOD) (e.g., 50-100% of 617 mAh/g) rechargeability can be achieved through addition of bismuth oxide and copper to the cathode material mixture. These additives are instrumental in maintaining the birnessite-phase through its conversion reactions in thousands of charge-discharge cycles. The birnessite-phase goes through dissolution-precipitation reactions, which sometimes can lead to loss of manganese ions. Also, in the presence of zinc, the birnessite-phase can lose potential due to the interaction of zinc. Therefore, in order to maintain high energy density in high DOD Zn/birnessite batteries, blocking the interaction of zinc and reducing the loss of manganese ions is paramount.

In this disclosure, the use of conductive interlayers in MnO$_2$|Zn batteries is disclosed, wherein the interlayers can be composed of carbon (e.g., conductive carbon), metal hydroxide(s), metal oxide(s), and in some embodiments, the interlayers can be composed of carbon mixed with a metal oxide and/or metal hydroxide phase like nickel hydroxide. The conductive carbon and carbon mixed with metal hydroxide or metal oxide interlayers can advantageously help in operating the MnO$_2$|Zn batteries at higher operating potentials beyond (e.g., above) about 1.65 V at constant current, as well as reduce the dissolution of manganese ions in the electrolyte and limit the formation of inactive phases to increase the DOD or the utilization to 20-100% of $1^{st}$ electron capacity and 50-100% of $2^{nd}$ electron capacity for primary and secondary battery applications.

In this disclosure, the use of conductive interlayers in primary and secondary MnO$_2$|Zn batteries is disclosed, wherein the interlayers can comprise a binder and carbon, or carbon mixed with a metal hydroxide, or only metal hydroxide; in order to advantageously reduce dissolution of manganese ions in the electrolyte, limit the formation of inactive phases to increase DOD or utilize about 20-100% of $1^{st}$ electron capacity and about 50-100% of $2^{nd}$ electron capacity, and allow higher potential operation with constant current charging for better zinc plating efficiency.

In this disclosure, a primary or rechargeable Zn—MnO$_2$ (MnO$_2$|Zn) alkaline battery is disclosed. The MnO$_2$|Zn battery includes an anode comprising zinc, a cathode with manganese dioxide (all polymorphs), a conductive carbon, and optional additive such as bismuth oxide, copper additives (for 50-100% of $2^{nd}$ electron capacity) and/or a binder, alkaline electrolyte and a conductive interlayer like carbon or carbon mixed with metal hydroxide or metal hydroxide with binder placed on the cathode. In some embodiments, the Zn—MnO$_2$ can advantageously access 20-100% of $1^{st}$ electron capacity with electrolytic manganese dioxide as the primary active phase. In some embodiments, the Zn—MnO$_2$ battery can advantageously access 50-100% of $2^{nd}$ electron capacity with birnessite as the primary active phase combined with bismuth oxide and copper as the additives. In some embodiments, the $1^{st}$ electron and $2^{nd}$ electron Zn—MnO$_2$ battery is used for primary and rechargeable applications. In some embodiments, the carbon can be graphite, carbon black, carbon nanotubes (multi and single walled), graphene, graphene oxide, expanded graphite, carbon fibers, etc. In some embodiments, the metal in the metal hydroxide can be nickel, bismuth, barium, copper, aluminum, or any combination thereof. In some embodiments, the binder can be TEFLON, carboxymethyl cellulose, polyvinyl alcohol, or combinations thereof. In some embodiments, the conductive interlayer can use TEFLON as the binder or polyvinyl alcohol. An advantage that may be realized in the practice of some disclosed embodiments of the battery is that the cathode with the conductive interlayer is rendered effective by being able to operate at higher operating potentials at constant current, which relates to a better plating efficiency of the zinc, while dissolution of the manganese ions in the electrolyte is minimized and formation of the inactive phases is minimized for relatively high depth of discharge applications.

Rechargeable characteristics of the $MnO_2$|Zn battery can be obtained by the addition of dopants or additives to the electrodes and/or electrolytes. The anode material can contain additives that enhance electrochemical activity and reduce gassing in the electrolyte. For electrode dopants, bismuth oxide, bismuth, indium, indium oxide, indium hydroxide, copper oxide, copper, aluminum oxide, aluminum, lead oxide, lead, bismuth sulfide, silver oxide, silver, nickel, nickel oxide, nickel hydroxide, cobalt and cobalt oxide, and any salts thereof, or any combination thereof can be used in both the cathode and the anode. Zn electrodes tend to gas in electrolytes with high hydroxyl activity. For inhibiting gassing of Zn electrodes, additives like bismuth, bismuth oxide, indium, indium oxide, indium hydroxide, cationic surfactants like cetyltrimethylammonium bromide, anion surfactants like sodium dodecyl sulfate, sodium dodecylbenzene sulfonate, polyethylene glycol, zinc oxide, carboxymethyl cellulose, polyvinyl alcohol, or any combination thereof can be used. Electrolyte additives (e.g., catholyte additive) can include manganese sulfate, nickel sulfate, potassium permanganate, manganese chloride, manganese acetate, manganese triflate, bismuth chloride, bismuth nitrate, manganese nitrate, nickel sulfate, nickel nitrate, zinc sulfate, zinc chloride, zinc acetate, zinc triflate, indium chloride, copper sulfate, copper chloride, lead sulfate, sodium persulfate, potassium persulfate, ammonium persulfate, ammonium chloride, vanillin, potassium chloride, sodium chloride, or any combination thereof.

Disclosed herein is a primary or rechargeable Zn—$MnO_2$ ($MnO_2$|Zn) battery having a conductive interlayer that helps in operation at higher voltage windows to advantageously allow for better zinc performance, limit dissolution of manganese ions, and limit formation of inactive phases for higher depth of discharge applications. The conductive interlayer comprises binder, and carbon or carbon with metal hydroxide. The binder can be TEFLON, carboxymethyl cellulose, polyvinyl alcohol, or any combination thereof. Applications for such a $MnO_2$|Zn battery could be in grid-scale energy storage, traction batteries, aerospace applications, electric vehicles, power packs, telecommunications, uninterruptible power supply (UPS), medical applications, etc., to name a few. Some embodiments of the cell or battery design where it could be used is shown in FIGS. 1A-1D. A prismatic and cylindrical battery design is shown, but the design of the $MnO_2$|Zn battery as disclosed herein is not limited to these battery form factors. The battery comprises a cathode, an anode, an electrolyte, and a separator. The designs shown in FIGS. 1A-1D are just a guide and are non-limiting. The prismatic battery design was used to test the battery. While disclosed as having zinc as the anode electroactive material, the anode can also comprise additional or alternative electroactive materials such as iron, aluminum, lithium, and/or magnesium.

In this disclosure, the $MnO_2$|Zn battery can be made of any geometric form factor if desired. To those skilled in the art, the $MnO_2$|Zn battery can be cylindrical or prismatic. Further, the $MnO_2$|Zn battery can also be made flexible if desired, by gelling of electrolytes and electrodes or by using binders in electrodes that allow for flexibility.

Figure 1B:
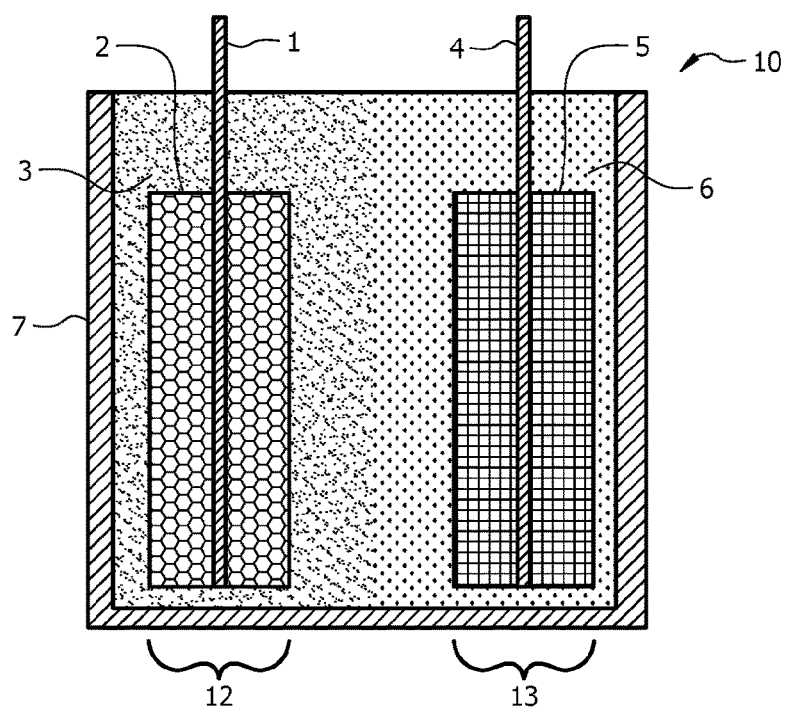
Figure 1C:
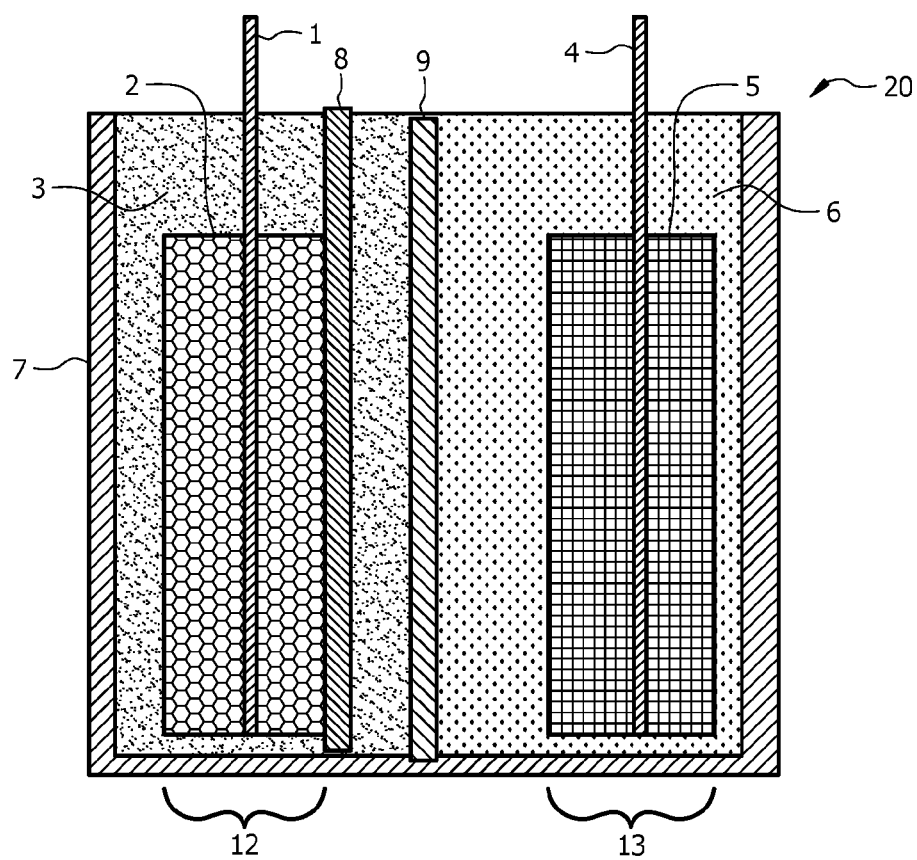
Figure 1D:
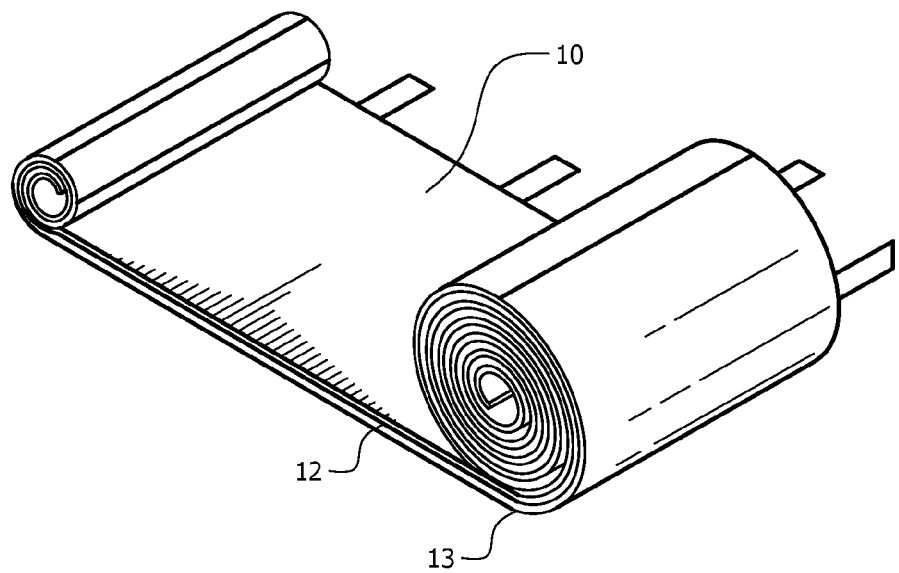

Referring to FIGS. 1A-1D, a battery 10 can have a housing 7, a cathode 12, which can include a cathode current collector 1 and a cathode material 2, and an anode 13. In some embodiments, the anode 13 can comprise an anode current collector 4, and an anode material 5. It is noted that the scale of the components in FIGS. 1A-1D may not be exact as the features are illustrated to clearly show the electrolyte around the anode 13 and the cathode 12. FIGS. 1A-1C shows a prismatic battery arrangement having a single anode 13 and cathode 12. In another embodiment, the battery can be a cylindrical battery (e.g., as shown in FIG. 1D) having the electrodes arranged concentrically or in a rolled configuration in which the anode and cathode are layered and then rolled to form a jelly roll configuration. The cathode current collector 1 and cathode material 2 are collectively called either the cathode 12 or the positive electrode 12, as shown in FIG. 1D. Similarly, the anode material 5 with the optional anode current collector 4 can be collectively called either the anode 13 or the negative electrode 13. An electrolyte can be in contact with the cathode 12 and the anode 13. As described in more detail herein, the electrolyte 15 in contact with both the cathode 12 and the anode 13 can be substantially the same; or alternatively, different electrolyte compositions can be used with the anode 13 and the cathode 12 to modify the properties of the battery 10 in some embodiments.

In some embodiments, the battery 10 can comprise one or more cathodes 12 and one or more anodes 13, which can be present in any configuration or form factor. When a plurality of anodes 13 and/or a plurality of cathodes 12 are present, the electrodes can be configured in a layered configuration such that the electrodes alternate (e.g., anode, cathode, anode, etc.). Any number of anodes 13 and/or cathodes 12 can be present to provide a desired capacity and/or output voltage. In the jellyroll configuration (e.g., as shown in FIG. 1D), the battery 10 may only have one cathode 12 and one anode 13 in a rolled configuration such that a cross section of the battery 10 includes a layered configuration of alternating electrodes, though a plurality of cathodes 12 and anodes 13 can be used in a layered configuration and rolled to form the rolled configuration with alternating layers.

In an embodiment, housing 7 comprises a molded box or container that is generally non-reactive with respect to the electrolyte solutions in the battery 10, including the electrolyte. In an embodiment, the housing 7 comprises a polymer (e.g., a polypropylene molded box, an acrylic polymer molded box, etc.), a coated metal, or the like.

In some embodiments, the cathode 12 can be manganese dioxide. The manganese dioxide can be of various polymorphs like alpha-phase, beta-phase, gamma-phase, epsilon-phase, delta-phase (which is a layered phase called birnessite), ramsdellite, lambda-phase, a mixture of the different phases, electrolytic manganese dioxide (EMD), chemically modified manganese dioxide, and any combination thereof.

The cathode 12 can comprise a mixture of components including an electrochemically active material (e.g., cathode electroactive material). Additional components such as a binder, a conductive material, and/or one or more additional components can also be optionally included that can serve to improve the lifespan, rechargeability, and electrochemical properties of the cathode 12. The cathode 12 can comprise a cathode material 2 (e.g., an electroactive material, additives, etc.). The cathode can comprise between about 1 wt. % and about 95 wt. % active material, alternatively between about 1 wt. % and about 90 wt. % active material, or alternatively between about 50 wt. % and about 90 wt. % active material. Suitable cathode materials 2 can include, but are not limited to, manganese dioxide, copper manganese oxide, hausmannite, manganese oxide, copper intercalated bismuth birnessite, birnessite, todokorite, ramsdellite, pyrolusite, pyrochroite, silver oxide, silver dioxide, silver, nickel oxyhydroxide, nickel hydroxide, nickel, lead oxide, copper oxide, copper dioxide, lead, lead dioxide (a and B), potassium persulfate, sodium persulfate, ammonium persulfate, potassium permanganate, calcium permanganate, barium permanganate, silver permanganate, ammonium permanganate, peroxide, gold, perchlorate, cobalt oxide (CoO, $CoO_2$, $Co_3O_4$), lithium cobalt oxide, sodium cobalt oxide, perchlorate, nickel oxide, bromine, mercury, vanadium oxide, bismuth vanadium oxide, hydroquinone, calix[4] quinone, tetrachlorobenzoquinone, 1,4-naphthoquinone, 9,10-anthraquinone, 1,2-napthaquinone, 9,10-phenanthrenequinone, nitroxide-oxammonium cation redox pair like 2,2,6,6-tetramethylpiperidin-1-yl)oxyl (TEMPO), carbon, 2,3-dicyano-5,6-dichlorodicyanoquinone, tetracyanoethylene, sulfur trioxide, ozone, oxygen, air, lithium nickel manganese cobalt oxide, sulfur, lithium iron phosphate, lithium copper oxide, lithium copper oxyphosphate, or any combination thereof. In some embodiments, the cathode can comprise an air electrode.

In some embodiments, the cathode material 2 can be based on one or many polymorphs of $MnO_2$, including electrolytic manganese dioxide (EMD), $\alpha$-$MnO_2$, $\beta$-$MnO_2$, $\gamma$-$MnO_2$, $\delta$-$MnO_2$, $\epsilon$—$MnO_2$, or $\lambda$-$MnO_2$. Other forms of $MnO_2$ can also be present such as hydrated $MnO_2$, pyrolusite, birnessite, ramsdellite, hollandite, romanechite, todorokite, lithiophorite, chalcophanite, sodium or potassium rich birnessite, cryptomelane, buserite, manganese oxyhydroxide (MnOOH), $\alpha$-MnOOH, $\gamma$-MnOOH, $\beta$-MnOOH, manganese hydroxide [$Mn(OH)_2$], partially or fully protonated manganese dioxide, $Mn_3O_4$, $Mn_2O_3$, bixbyite, MnO, lithiated manganese dioxide ($LiMn_2O_4$, $Li_2MnO_3$), $CuMn_2O_4$, aluminum manganese oxide, zinc manganese dioxide, bismuth manganese oxide, copper intercalated birnessite, copper intercalated bismuth birnessite, tin doped manganese oxide, magnesium manganese oxide, or any combination thereof. In general, the cycled form of manganese dioxide in the cathode can have a layered configuration, which in some embodiment can comprise $\delta$-$MnO_2$ that is interchangeably referred to as birnessite. If non-birnessite polymorphic forms of manganese dioxide are used, these can be converted to birnessite in-situ by one or more conditioning cycles as described in more details below. For example, a full or partial discharge to the end of the $MnO_2$ second electron stage (e.g., between about 20% to about 100% of the $2^{nd}$ electron capacity of the cathode, or alternatively between about 50% to about 100% of the $2^{nd}$ electron capacity of the cathode) may be performed and subsequently recharging back to its $Mn^{4+}$ state, resulting in birnessite-phase manganese dioxide. Combinations of electroactive materials can also be employed in the cathode materials 2. The electroactive cathode materials 2 can be in the form of powders of varying particle sizes (nanometers to micrometers) and/or in the form of metallic substrates with planar, mesh or perforated-type architecture.

In some embodiments, the manganese dioxide in the cathode material 2 can be alpha-manganese dioxide, beta-manganese dioxide, gamma-manganese dioxide, lambda-manganese dioxide, epsilon-manganese dioxide, delta-manganese dioxide (or birnessite), chemically modified manganese dioxide, ramsdellite, electrolytic manganese dioxide (EMD), and combinations thereof. The birnessite polymorph of manganese dioxide can be synthesized ex-situ or in-situ by completely discharging and charging the EMD to access higher depth of discharge of the $2^{nd}$ electron capacity.

The addition of a conductive additive such as conductive carbon enables high loadings of an electroactive material (e.g., manganese dioxide ($MnO_2$)) in the cathode material, resulting in high volumetric and gravimetric energy density. In some embodiments, the conductive additive can be present in the cathode material 2 in an amount of about 1-90 wt. %, alternatively about 1-50 wt. %, alternatively about 10-50 wt. %, or alternatively about 1-30 wt. %, based on the total weight of the cathode material 2. Nonlimiting examples of conductive carbon suitable for use in the present disclosure as a conductive additive include single walled carbon nanotubes, multi-walled carbon nanotubes, graphene, carbon blacks of various surface areas, any other suitable conductive carbon that specifically has relatively very high surface area and conductivity, or any combination thereof. In some embodiments, the conductive additive can comprise graphite, carbon fiber, carbon black, acetylene black, single walled carbon nanotubes, multi-walled carbon nanotubes, nickel or copper coated carbon nanotubes, dispersions of single walled carbon nanotubes, dispersions of multi-walled carbon nanotubes, graphene, graphyne, graphene oxide, or a combination thereof. Higher loadings of the electroactive material (e.g., manganese dioxide ($MnO_2$)) in the cathode are, in some embodiments, desirable to increase the energy density. Other examples of conductive carbon include TIMREX Primary Synthetic Graphite (all types), TIMREX Natural Flake Graphite (all types), TIMREX MB, MK, MX, KC, B, LB Grades (examples, KS15, KS44, KC44, MB15, MB25, MK15, MK25, MK44, MX15, MX25, BNB90, LB family) TIMREX Dispersions; ENASCO 150G, 210G, 250G, 260G, 350G, 150P, 250P; SUPER P, SUPER P Li, carbon black (examples include Ketjenblack EC-300J, Ketjenblack EC-600JD, Ketjenblack EC-600JD powder), acetylene black, carbon nanotubes (single or multi-walled), Zenyatta graphite, and/or combinations thereof.

In some embodiments, the conductive additive (e.g., conductive carbon) can have a particle size range from about 1 to about 50 microns, or between about 2 and about 30 microns, or between about 5 and about 15 microns. In an embodiment, the conductive additive can include expanded graphite having a particle size range from about 10 to about 50 microns, or from about 20 to about 30 microns. Carbon fibers and nanotubes can have varying aspect ratios where their diameters can be in the tens to hundreds of nanometers. In some embodiments, the mass ratio of graphite to the conductive additive can range from about 5:1 to about 50:1, or from about 7:1 to about 28:1. The total conductive additive mass percentage (e.g., total carbon mass percentage) in the cathode material 2 can range from about 1% to about 99%, alternatively from about 5% to about 99%, alternatively from about 1% to about 90%, alternatively from about 1% to about 50%, alternatively from about 5% to about 99%, alternatively from about 10% to about 80%, or alternatively from about 10% to about 50%. In some embodiments, the electroactive component in the cathode material 2 can be between 1 and 99 wt. % of the weight of the cathode material 2, and the conductive additive can be between 1 and 99 wt. % of the weight of the cathode material 2.

In some embodiments, the cathode material 2 can also comprise a conductive component. The addition of a conductive component such as metal additives to the cathode material 2 may be accomplished by addition of one or more metal powders such as nickel powder to the cathode material 2. The conductive metal component can be present in a concentration of between about 0-30 wt. % in the cathode material 2. The conductive metal component may be, for example, nickel, copper, silver, gold, tin, cobalt, antimony, brass, bronze, aluminum, calcium, iron, or platinum. In one embodiment, the conductive metal component is a powder. In some embodiments, the conductive component can be added as an oxide and/or salt. For example, the conductive component can be cobalt oxide, cobalt hydroxide, lead oxide, lead hydroxide, or a combination thereof. In some embodiments, a second conductive metal component is added to act as a supportive conductive backbone for the first and second electron reactions to take place. The second electron reaction has a dissolution-precipitation reaction where $Mn^{3+}$ ions become soluble in the electrolyte and precipitate out on the materials such as graphite resulting in an electrochemical reaction and the formation of manganese hydroxide [$Mn(OH)_2$] which is non-conductive. This ultimately results in a capacity fade in subsequent cycles. Suitable conductive components that can help to reduce the solubility of the manganese ions include transition metals like Ni, Co, Fe, Ti and metals like Ag, Au, Al, Ca. Oxides and salts of such metals are also suitable. Transition metals like Co can also help in reducing the solubility of $Mn^{3+}$ ions. Such conductive metal components may be incorporated into the electrode by chemical means or by physical means (e.g. ball milling, mortar/pestle, spex mixture). An example of such an electrode comprises 5-95% birnessite, 5-95% conductive carbon, 0-50% conductive component (e.g., a conductive metal), and 1-10% binder.

In some embodiments, dopants or additives can be added to the cathode material 2, as necessary to enhance rechargeability and performance. The additives can be in the form of powders mixed with the electroactive material or in the form of metallic substrates onto which the electroactive and conductive carbon can be pasted onto. Nonlimiting examples of additives suitable for use in the electrode materials of this disclosure include bismuth, bismuth oxide, copper oxide, copper, indium, indium hydroxide, indium oxide, aluminum, aluminum oxide, nickel, nickel hydroxide, nickel oxide, silver, silver oxide, cobalt, cobalt oxide, cobalt hydroxide, lead, lead oxide, lead dioxide, quinones, salts thereof, derivatives thereof, or any combination thereof. In some embodiments, the dopants or additives can be present in the cathode material 2 in an amount between 0 to 30 wt. %, based on the total weight of the cathode material 2.

The cathode material 2 can comprise additional elements, such as dopants or additives. The additional elements can be included in the cathode material including a bismuth/bismuth compound and/or copper/copper compounds, which together allow improved galvanostatic battery cycling of the cathode. When present as birnessite, the copper and/or bismuth can be incorporated into the layered nanostructure of the birnessite. The resulting birnessite cathode material can exhibit improved cycling and long-term performance with the copper and bismuth incorporated into the crystal and nanostructure of the birnessite.

The bismuth or bismuth-based compounds can be used in the cathode material 2 to access relatively greater capacity (e.g., 50-100%) from the manganese dioxide $2^{nd}$ electron capacity. The bismuth or bismuth-based compounds can be used in batteries where manganese dioxide is usually the layered-phase birnessite. The bismuth or bismuth-based compounds can also be used in batteries where the manganese dioxide can be any polymorph and wherein discharging it completely to 617 mAh/g and charging it back results in the formation of birnessite.

The bismuth compound can be incorporated into the cathode 12 as an inorganic or organic salt of bismuth (oxidation states 5, 4, 3, 2, or 1), as a bismuth oxide, or as bismuth metal (i.e., elemental bismuth). The bismuth compound can be present in the cathode material at a concentration between about 1-20 wt. % of the weight of the cathode material 2. Examples of bismuth compounds include bismuth oxide, bismuth chloride, bismuth bromide, bismuth fluoride, bismuth iodide, bismuth sulfate, bismuth nitrate, bismuth trichloride, bismuth citrate, bismuth telluride, bismuth selenide, bismuth subsalicylate, bismuth neodecanoate, bismuth carbonate, bismuth subgallate, bismuth strontium calcium copper oxide, bismuth acetate, bismuth trifluoromethanesulfonate, bismuth nitrate oxide, bismuth gallate hydrate, bismuth phosphate, bismuth cobalt zinc oxide, bismuth sulphite agar, bismuth oxychloride, bismuth aluminate hydrate, bismuth tungsten oxide, bismuth lead strontium calcium copper oxide, bismuth antimonide, bismuth antimony telluride, bismuth oxide yttria stabilized (e.g., yttria doped bismuth oxide), bismuth-lead alloy, ammonium bismuth citrate, 2-napthol bismuth salt, dichloritri (o-tolyl)bismuth, dichlorodiphenyl(p-tolyl)bismuth, triphenylbismuth, and/or combinations thereof.

The copper or copper-based compounds can be used in the cathode material 2 to access relatively greater capacity (e.g., 50-100%) from the manganese dioxide $2^{nd}$ electron capacity. The copper or copper-based compounds can be used in batteries where manganese dioxide is usually the layered-phase birnessite. The copper or copper-based compounds can also be used in batteries, wherein the manganese dioxide can be any polymorph and discharging it completely to 617 mAh/g and charging it back results in the formation of birnessite. It is advantageous to use copper or copper-based compounds in batteries accessing 50-100% of the 617 mAh/g for thousands of cycles, as Cu helps in the rechargeability and with reducing the charge transfer resistance.

The copper compound can be incorporated into the cathode 12 as an organic or inorganic salt of copper (oxidation states 1, 2, 3, or 4), as a copper oxide, or as copper metal (i.e., elemental copper). The copper compound can be present in a concentration between about 1-70 wt. % of the weight of the cathode material 2. In some embodiments, the copper compound is present in a concentration between about 5-50 wt. % of the weight of the cathode material 2. In other embodiments, the copper compound is present in a concentration between about 10-50 wt. % of the weight of the cathode material 2. In yet other embodiments, the copper compound is present in a concentration between about 5-20 wt. % of the weight of the cathode material 2. Examples of copper compounds include copper and copper salts such as copper aluminum oxide, copper (I) oxide, copper (II) oxide and/or copper salts in a +1, +2, +3, or +4 oxidation state including, but not limited to, copper nitrate, copper sulfate, copper chloride, etc. The effect of copper is to alter the oxidation and reduction voltages of bismuth. This results in a cathode with full reversibility during galvanostatic cycling, as compared to a bismuth-modified $MnO_2$ which cannot withstand galvanostatic cycling as well.

In some embodiments, the copper can be used in the cathode material 2 in powder form, metallic form fabricated as a mesh, foil, wire, ingot, or any suitable shape and/or form.

In some embodiments, a binder can be used with the cathode material 2. The binder can be present in a concentration of between about 0-10 wt. %, or alternatively between about 1-5 wt. % by weight of the cathode material. In some embodiments, the binder comprises water-soluble cellulose-based hydrogels, which can be used as thickeners and strong binders, and have been cross-linked with good mechanical strength and with conductive polymers. The binder may also be a cellulose film sold as cellophane. The binders can be made by physically cross-linking the water-soluble cellulose-based hydrogels with a polymer through repeated cooling and thawing cycles. In some embodiments, the binder can comprise a 0-10 wt. % carboxymethyl cellulose (CMC) solution cross-linked with 0-10 wt. % polyvinyl alcohol (PVA) on an equal volume basis. The binder, compared to the traditionally-used TEFLON® or PTFE (polytetrafluoroethylene), shows superior performance. TEFLON® or PTFE is a very resistive material, but its use in the industry has been widespread due to its good rollable properties. This, however, does not rule out using TEFLON® or PTFE as a binder. In some embodiments, TEFLON® can be used as a binder. Mixtures of TEFLON® or PTFE with the aqueous binder and some conductive carbon can be used to create rollable binders. Using the aqueous-based binder can help in achieving a significant fraction of the two-electron capacity with minimal capacity loss over many cycles. In some embodiments, the binder can be water-based, have superior water retention capabilities, adhesion properties, and help to maintain the conductivity relative to an identical cathode using a PTFE binder instead. Examples of suitable water-based hydrogels (e.g., water-soluble cellulose-based hydrogels) can include, but are not limited to, methyl cellulose (MC), carboxymethyl cellulose (CMC), hydroxypropyl cellulose (HPH), hydroypropylmethyl cellulose (HPMC), hydroxyethylmethyl cellulose (HEMC), carboxymethylhydroxyethyl cellulose, hydroxyethyl cellulose (HEC), and combinations thereof. Examples of crosslinking polymers (e.g., conductive polymers) include polyvinyl alcohol, polyvinylacetate, polyaniline, polyvinylpyrrolidone, polyvinylidene fluoride, polypyrrole, and combinations thereof. In some embodiments, a 0-10 wt. % solution of water-cased cellulose hydrogen can be cross-linked with a 0-10 wt. % solution of crosslinking polymers by, for example, repeated freeze/thaw cycles, radiation treatment, and/or chemical agents (e.g., epichlorohydrin). The aqueous binder may be mixed with 0-5% PTFE to improve manufacturability. In some embodiments, polyvinyl alcohol (PVA) can be used as a binder by itself.

The cathodes 12 can be produced using methods implementable in large-scale manufacturing. For a $MnO_2$ cathode, the cathode 12 can be capable of delivering the full second electron capacity of the $MnO_2$.

In some embodiments, the cathode material 2 can comprises 2-30 wt. % conductive carbon, 0-30 wt. % conductive metal additive, 1-70 wt. % copper compound, 1-20 wt. % bismuth compound, 0-10 wt. % binder and birnessite or EMD. In another embodiment, the cathode material comprises 2-30 wt. % conductive carbon, 0-30 wt. % conductive metal additive, 1-20 wt. % bismuth compound, 0-10 wt. % binder and birnessite or EMD. In one embodiment, the cathode material consists essentially of 2-30 wt. % conductive carbon, 0-30 wt. % conductive metal additive, 1-70 wt. % copper compound, 1-20 wt. % bismuth compound, 0-10 wt. % binder, and the balance is birnessite or EMD. In another embodiment, the cathode material consists essentially of 2-30 wt. % conductive carbon, 0-30 wt. % conductive metal additive, 1-20 wt. % bismuth compound, 0-10 wt. % binder, and the balance is birnessite or EMD.

In embodiments where 20-100% of $1^{st}$ electron capacity is accessed, the cathode material 2 can comprise 50-90 wt. % manganese dioxide, 10-50 wt. % conductive carbon, and 0-10 wt. % binder.

In embodiments where 50-100% of $2^{nd}$ electron capacity is accessed, the cathode material 2 can comprise 1-90 wt. % manganese dioxide, 0-30 wt. % bismuth or bismuth-based compounds, 0-50 wt. % copper or copper-based compounds, 1-90 wt. % conductive carbon, and 0-10 wt. % binder.

The resulting cathode may have a porosity in the range of 20%-85% as determined by mercury infiltration porosimetry. The porosity can be measured according to ASTM D4284-12 "Standard Test Method for Determining Pore Volume Distribution of Catalysts and Catalyst Carriers by Mercury Intrusion Porosimetry" using the version as of the date of the filing of this application.

The cathode material 2 can be formed on a cathode current collector 1 formed from a conductive material that serves as an electrical connection between the cathode material and an external electrical connection or connections. In some embodiments, the cathode current collector 1 can be, for example, carbon, lead, nickel, steel (e.g., stainless steel, etc.), nickel-coated steel, nickel plated copper, tin-coated steel, copper plated nickel, silver coated copper, copper, magnesium, aluminum, tin, iron, platinum, silver, gold, titanium, bismuth, half nickel and half copper, or any combination thereof. In some embodiments, the current collector 1 can comprise a carbon felt, carbon foam, a conductive polymer mesh, or any combination thereof. The cathode current collector may be formed into a mesh (e.g., an expanded mesh, woven mesh, etc.), perforated metal, foam, foil, felt, fibrous architecture, porous block architecture, perforated foil, wire screen, a wrapped assembly, or any combination thereof. In some embodiments, the current collector can be formed into or form a part of a pocket assembly, where the pocket can hold the cathode material 2 within the current collector 1. A tab (e.g., a portion of the cathode current collector 1 extending outside of the cathode material 2 as shown at the top of the cathode 12 in FIG. 1B) can be coupled to the current collector to provide an electrical connection between an external source and the current collector.

The cathode material 2 can be pressed onto the cathode current collector 1 to form the cathode 12. For example, the cathode material 2 can be adhered to the cathode current collector 1 by pressing at, for example, a pressure between 1,000 psi and 20,000 psi (between $6.9 \times 10^6$ and $1.4 \times 10^8$ Pascals). The cathode material 2 may be adhered to the cathode current collector 1 as a paste. The resulting cathode 12 can have a thickness of between about 0.1 mm to about 5 mm.

In some embodiments, the anode material 5 can comprise an electroactive material, which can be Zn. Zn can exist in powder form or as a metallic structure in the anode material 5. The Zn powder can be of varying sizes ranging from nanometers to microns. The Zn metallic structure can be a foil, mesh, perforated foil, foam, sponge-type, or any combination thereof.

While the current disclosure is discussed in detail in the context of a Zn anode, it should be understood that other anode electroactive materials (e.g., metals other than Zn) can be used to form a manganese dioxide battery. In some embodiments, the anode can comprise lithium, zinc, aluminum, magnesium, iron, calcium, strontium, lanthanum, potassium, sodium, zirconium, titanium, titanium oxide, indium, indium oxide, indium hydroxide, zinc oxide, $Mn_3O_4$, hetaerolite ($ZnMn_2O_4$), vanadium, tin, tin oxide, barium hydroxide, barium, cesium, aluminum hydroxide, copper, bismuth, silicon, carbon and a mixture of any of these materials. The cells as described herein can be formed by pairing of any of the cathode materials described herein and any of the anode materials as described to the extent that the materials mentioned above to generate a voltage in the presence of suitable electrolytes.

In some embodiments, the anode 13 may comprise Zn metal (100 wt. %) or Zn powder of various morphologies (e.g., sphere, fiber, wire, tube, sheet, etc.) and/or sizes. In some embodiments, the anode material 5 can comprise 1-99 wt. % Zn powder, 0-99 wt. % zinc oxide (ZnO), and the remaining wt. % (the balance) as binder. In some embodiments, conductive, gas inhibitor and complexing additives like copper (Cu), indium, indium oxide, bismuth, bismuth oxide, aluminum, aluminum oxide, aluminum hydroxide and calcium hydroxide can be added in 1-20 wt. % in place of the ZnO.

In some embodiments, the anode material 5 can comprise zinc, which can be present as elemental zinc and/or zinc oxide. In some embodiments, the Zn anode mixture comprises Zn, zinc oxide (ZnO), an electronically conductive material, and a binder. The Zn may be present in the anode material 5 in an amount of from about 50 wt. % to about 90 wt. %, alternatively from about 60 wt. % to about 80 wt. %, or alternatively from about 65 wt. % to about 75 wt. %, based on the total weight of the anode material. Additional elements that can be in the anode in addition to the zinc or in place of the zinc include, but are not limited to, lithium, aluminum, magnesium, iron, cadmium and a combination thereof, where each element can be present in amounts that are the same or similar to that of the zinc described herein.

In some embodiments, the anode material 5 can comprise zinc metal, or zinc powders, zinc powders mixed with zinc oxide, or combinations thereof; and binder.

In some embodiments, the anode material 5 can comprise zinc oxide (ZnO), which can be formed into Zn by a charging step in-situ during battery operation. In some embodiments, the anode material 5 can comprise ZnO in an amount of from about 5 wt. % to about 20 wt. %, alternatively from about 5 wt. % to about 15 wt. %, or alternatively from about 5 wt. % to about 10 wt. %, based on the total weight of anode material. As will be appreciated by one of skill in the art, and with the help of this disclosure, the purpose of the ZnO in the anode mixture is to provide a source of Zn during the recharging steps, and the zinc present can be converted between zinc and zinc oxide during charging and discharging phases.

In an embodiment, an electrically conductive material may be optionally present in the anode material in an amount of from about 5 wt. % to about 20 wt. %, alternatively from about 5 wt. % to about 15 wt. %, or alternatively from about 5 wt. % to about 10 wt. %, based on the total weight of the anode material. As will be appreciated by one of skill in the art, and with the help of this disclosure, the electrically conductive material can be used in the anode mixture as a conducting agent, e.g., to enhance the overall electric conductivity of the anode mixture. Non-limiting examples of electrically conductive material suitable for use can include any of the conductive carbons described herein such as carbon, graphite, graphite powder, graphite powder flakes, graphite powder spheroids, carbon black, activated carbon, conductive carbon, amorphous carbon, glassy carbon, and the like, or combinations thereof. The conductive material can also comprise any of the conductive carbon materials described with respect to the cathode material including, but not limited to, acetylene black, single walled carbon nanotubes, multi-walled carbon nanotubes, graphene, graphyne, or any combinations thereof. In some embodiments, the electrically conductive material used in the anode mixture can comprise a metallic conductive powder, wherein the metallic conductive powder comprises copper, bismuth, indium, nickel, silver, tin, etc., or any combination thereof.

The anode material 5 may also comprise a binder. Generally, a binder functions to hold the electroactive material particles together and in contact with the current collector. The binder can be present in a concentration of 0-10 wt. %. The binders in the anode material 5 can also comprise any of the binders described herein with respect to the cathode material. The binders may comprise water-soluble cellulose-based hydrogels like methyl cellulose (MC), carboxymethyl cellulose (CMC), hydroypropyl cellulose (HPH), hydroypropylmethyl cellulose (HPMC), hydroxethylmethyl cellulose (HEMC), carboxymethylhydroxyethyl cellulose and hydroxyethyl cellulose (HEC), which can be used as thickeners and strong binders, and have been cross-linked with good mechanical strength and with conductive polymers like polyvinyl alcohol, polyvinylacetate, polyaniline, polyvinylpyrrolidone, polyvinylidene fluoride and polypyrrole. The binder may also be a cellulose film sold as cellophane. The binder may also be PTFE, which is a very resistive material, but its use in the industry has been widespread due to its good rollable properties. In some embodiments, the binder may be present in the anode material in an amount of from about 2 wt. % to about 10 wt. %, alternatively from about 2 wt. % to about 7 wt. %, or alternatively from about 4 wt. % to about 6 wt. %, based on the total weight of the anode material.

In some embodiments, the anode material 5 can be used by itself without a separate anode current collector 4, though a tab or other electrical connection can still be provided to the anode material 5. In this embodiment, the anode material may have the form or architecture of a foil, a mesh, a perforated layer, a foam, a felt, or a powder. For example, the anode can comprise a metal foil electrode, a mesh electrode, or a perforated metal foil electrode.

In some embodiments, the anode 13 can comprise an optional anode current collector 4. The anode current collector 4 can be used with an anode 13, including any of those described with respect to the cathode 12. The anode material 5 can be pressed onto the anode current collector 4 to form the anode 13. For example, the anode material 5 can be adhered to the anode current collector 4 by pressing at, for example, a pressure between 1,000 psi and 20,000 psi (between $6.9 \times 10^6$ and $1.4 \times 10^8$ Pascals). The anode material 5 may be adhered to the anode current collector 4 as a paste. A tab of the anode current collector 4, when present, can extend outside of the device to form the current collector tab. The resulting anode 13 can have a thickness of between about 0.1 mm to about 5 mm.

In some embodiments, the cathode material and the anode material with their corresponding electroactive materials can also be formed from dissolved salts in the corresponding electrolytes (e.g., catholyte and anolyte, respectively). The process of forming the cathode material and the anode material from dissolved salts in the corresponding electrolytes would involve a charging step or a formation step, where the dissolved salts containing the active ions are plated onto the current collector by electrons flowing from an outside circuit. For example, manganese salts like manganese sulfate, manganese triflate, etc. may electroplate $MnO_2$ during the charging or formation step. Similarly, zinc oxide dissolved into the anolyte will form Zn during the charging or formation step.

As disclosed herein, the cathode and anode materials can be adhered to the corresponding current collector by pressing at, for example, a pressure between 1,000 psi and 20,000 psi (between $6.9 \times 10^6$ and $1.4 \times 10^8$ Pascals). The cathode and anode materials may be adhered to the corresponding current collector as a paste. A tab of each current collector may extend outside of the device and cover less than 0.2% of the electrode area. In some embodiments, the cathode current collector and the anode current collector may be a conductive material, for example, nickel, nickel-coated steel, tin-coated steel, silver coated copper, copper plated nickel, nickel plated copper, copper or similar material. The cathode current collector and/or the anode current collector may be formed into an expanded mesh, perforated mesh, foil or a wrapped assembly.

In some embodiments, and as shown in FIG. 1B, the battery 10 may not comprise a separator, for example by using a polymer gelled electrolyte (PGE) that can serve the function of the separator by forming a physical barrier between the anode 13 and the cathode 12 to prevent short circuiting.

In some embodiments, a separator 9 (e.g., as shown in FIG. 1C) and/or buffer layer can be disposed between the anode 13 and the cathode 12 when the electrodes are constructed into the battery. The separator (e.g., separator 9) clearly demarcates the cathode from the anode. While shown as being disposed between the anode 13 and the cathode 12, the separator 9 can be used to wrap one or more of the anode 13 and/or the cathode 12, or alternatively one or more anodes 13 and/or cathodes 12 when multiple anodes 13 and cathodes 12 are present.

The separator 9 may comprise one or more layers. For example, when the separator is used, between 1 to 5 layers of the separator can be applied between adjacent electrodes. The separator can be formed from a suitable material such as nylon, polyester, polyethylene, polypropylene, poly(tetrafluoroethylene) (PTFE), poly(vinyl chloride) (PVC), polyvinyl alcohol, cellulose, or any combination thereof. Suitable layers and separator forms can include, but are not limited to, a polymeric separator layer such as a sintered polymer film membrane, polyolefin membrane, a polyolefin nonwoven membrane, a cellulose membrane, a cellophane, a battery-grade cellophane, a hydrophilically modified polyolefin membrane, and the like, or combinations thereof. As used herein, the phrase "hydrophilically modified" refers to a material whose contact angle with water is less than 45°. In another embodiment, the contact angle with water of the material used in the separator is less than 30°. In yet another embodiment, the contact angle with water of the material used in the separator is less than 20°. The polyolefin may be modified by, for example, the addition of TRITON X-100™ or oxygen plasma treatment. In some embodiment, the separator 9 may be a polymeric separator (e.g., cellophane, sintered polymer film, a hydrophilically modified polyolefin). In some embodiments, the separator 9 can comprise a CELGARD® brand microporous separator. In an embodiment, the separator 9 can comprise a FS 2192 SG membrane, which is a polyolefin nonwoven membrane commercially available from Freudenberg, Germany. In some embodiments, the separator can comprise a lithium super ionic conductor (LISICON®), sodium super ionic conductions (NASICON), NAFION®, a bipolar membrane, a water electrolysis membrane, a composite of polyvinyl alcohol and graphene oxide, polyvinyl alcohol, crosslinked polyvinyl alcohol, or a combination thereof.

While the separator 9 can comprise a variety of materials, the use of a PGE for the electrolyte can allow for a relatively inexpensive separator 9 to be used when one or more separators are present. For example, the separator 9 can comprise CELLOPHANER, polyvinyl alcohol, CELGARD®, a composite of polyvinyl alcohol and graphene oxide, crosslinked polyvinyl alcohol, PELLON®, and/or a composite of carbon-polyvinyl alcohol. Use of the separator 9 may help in improving the cycle life of the battery 20, but is not necessary in all embodiments.

When a buffer layer is used, the buffer layer can be used alone or in combination with a separator 9. The buffer layer can comprise a gelled solution that can comprise the same electrolyte formulation as the anolyte and/or the catholyte. For example, the buffer layer can be a PGE as described herein. One or more additives can also be present in the buffer layer such as calcium hydroxide, layered double hydroxides like hydrotalcites, quintinite, fougerite, magnesium hydroxide, or combinations thereof.

In some embodiments, the separator comprises an ion-selective gel; wherein the ion-selective gel comprises an ionomer, a bipolar membrane, a cation-exchange membrane, an anion-exchange membrane, a cellophane grafted with ion-selective properties, a polymeric membrane, a polyvinyl alcohol grafted with ion-selective properties, a ceramic separator, an ion-selective ceramic separator, NaSiCON, LiSiCON, or any combination thereof. Cellulose-based membranes like cellophane can also be used as separators. Polymeric membranes having cation-exchange properties like Nafion and/or anion-exchange membranes can be used as separators. Polyvinyl alcohol (PVA) and/or cross-linked polyvinyl alcohol (C-PVA) can also be used as polymeric separators. The cellulose-based membranes, PVA, and C-PVA can be grafted with ionomers that may impart cation and/or anion exchange properties. Bipolar membranes can also be used as separators.

As shown in FIGS. 1A-1D, a catholyte 3 can be in contact with the cathode 12, and an anolyte 6 can be in contact with the anode 13. The catholyte 3 can be disposed in the housing 10 in contact with the cathode material 2. The anolyte 6 can be disposed in the housing 10 in contact with the anode material 5. In some embodiments, the catholyte 3 and the anolyte 6 can have substantially the same composition. For example, in some embodiments, both the catholyte 3 and the anolyte 6 can be liquid. In other embodiments, the catholyte 3 and the anolyte 6 can have different compositions. For example, in some embodiments, the anolyte 6 can be polymerized or gelled, and the catholyte 3 can be a liquid. As another example, in other embodiments, the catholyte 3 can be polymerized or gelled, and the anolyte 6 can be a liquid. The polymerization of the catholyte 3 and/or the anolyte 6 can prevent mixing between the catholyte 3 and the anolyte 6. In yet other embodiments, both the catholyte 3 and the anolyte 6 can be gelled.

An electrolyte (e.g. an alkaline hydroxide, such as NaOH, KOH, LiOH, or mixtures thereof) can be contained within the free spaces of the electrodes 12, 13, the separator 9, and the housing 7. The electrolyte may have a concentration of between 5% and 50% w/w. The electrolyte can be in the form of a liquid and/or gel. For example, the battery 10 can comprise an electrolyte that can be gelled to form a semi-solid polymerized electrolyte. In some embodiments, the electrolyte can be an alkaline electrolyte. The alkaline electrolyte can be a hydroxide such as potassium hydroxide, sodium hydroxide, lithium hydroxide, ammonium hydroxide, cesium hydroxide, or any combination thereof. The resulting electrolyte can have a pH greater than 7, for example between 7 and 15.1. In some embodiments, the pH of the electrolyte can be greater than or equal to 10 and less than or equal to about 15.13.

Nonlimiting examples of alkaline electrolytes or ions having relatively high hydroxyl activity suitable for use in the electrolyte include ammonia, methylamine, glycine, lithium hydroxide, sodium hydroxide, potassium hydroxide, caesium hydroxide, rubidium hydroxide, calcium hydroxide, strontium hydroxide, barium hydroxide, or any combination thereof.

In some embodiments, the electrolyte can be an alkaline electrolyte. As disclosed herein, the alkaline electrolyte can be a hydroxide such as potassium hydroxide, sodium hydroxide, lithium hydroxide, ammonium hydroxide, cesium hydroxide, or any combination thereof. In some embodiments, the alkaline electrolyte can have a pH of greater than 7, alternatively equal to or greater than 8, alternatively equal to or greater than 9, alternatively equal to or greater than 10, alternatively equal to or greater than 11, or alternatively equal to or greater than 12, or alternatively equal to or greater than 13. In some embodiments, the pH of the anolyte can be greater than or equal to about 8 and less than or equal to about 15.13, alternatively greater than or equal to about 10 and less than or equal to about 15.13, alternatively greater than or equal to about 11 and less than or equal to about 15.13 alternatively greater than or equal to about 12 and less than or equal to about 15.13, or alternatively greater than or equal to about 13 and less than or equal to about 15.13.

In some embodiments, the electrolyte may comprise an alkaline hydroxide selected from the group consisting of sodium hydroxide, potassium hydroxide, cesium hydroxide, rubidium hydroxide, lithium hydroxide, and combinations thereof.

In addition to a hydroxide, the electrolyte can comprise additional components. In some embodiments, the alkaline electrolyte can have zinc oxide, potassium carbonate, potassium iodide, and/or potassium fluoride as additives. When zinc compounds are present in the electrolyte, the electrolyte can comprise zinc sulfate, zinc chloride, zinc acetate, zinc carbonate, zinc chlorate, zinc fluoride, zinc formate, zinc nitrate, zinc oxalate, zinc sulfite, zinc tartrate, zinc cyanide, zinc oxide, sodium hydroxide, potassium hydroxide, lithium hydroxide, potassium chloride, sodium chloride, potassium fluoride, lithium nitrate, lithium chloride, lithium bromide, lithium bicarbonate, lithium acetate, lithium sulfate, lithium permanganate, lithium nitrate, lithium nitrite, lithium perchlorate, lithium oxalate, lithium fluoride, lithium carbonate, lithium bromate, acrylic acid, N,N'-Methylenebisacrylamide, potassium persulfate, ammonium persulfate, sodium persulfate, or a combination thereof.

In other embodiments, the electrolyte can be an aqueous solution having an acidic or neutral pH. When the electrolyte is acid, the electrolyte can comprise an acid such as a mineral acid (e.g., hydrochloric acid, nitric acid, sulfuric acid, etc.). In some embodiments, the electrolyte solution can comprise a solution comprising potassium permanganate, sodium permanganate, lithium permanganate, calcium permanganate, manganese sulfate, manganese chloride, manganese nitrate, manganese perchlorate, manganese acetate, manganese bis(trifluoromethanesulfonate), manganese triflate, manganese carbonate, manganese oxalate, manganese fluorosilicate, manganese ferrocyanide, manganese bromide, magnesium sulfate, zinc sulfate, zinc triflate, zinc acetate, zinc nitrate, bismuth chloride, bismuth nitrate, nitric acid, sulfuric acid, hydrochloric acid, sodium sulfate, potassium sulfate, sodium hydroxide, potassium hydroxide, titanium sulfate, titanium chloride, lithium nitrate, lithium chloride, lithium bromide, lithium bicarbonate, lithium acetate, lithium sulfate, lithium nitrate, lithium nitrite, lithium hydroxide, lithium perchlorate, lithium oxalate, lithium fluoride, lithium carbonate, lithium sulfate, lithium bromate, or any combination thereof. In some embodiments, the electrolyte can be an acidic or neutral solution, and the pH of the electrolyte can be between 0 and 7.

In some embodiments, the pH of the electrolyte can be altered by using bases of different strengths, where the following from low to high strength can be used: ammonia, methylamine, glycine, lithium hydroxide, sodium hydroxide, potassium hydroxide, caesium hydroxide, rubidium hydroxide, calcium hydroxide, strontium hydroxide, barium hydroxide, or any combination thereof. While these examples of alkaline electrolytes can help alter hydroxyl activity, it should be apparent to anyone skilled in chemistry or electrochemistry that any combination of alkaline electrolytes and other electrolytes can be used to alter hydroxyl activity.

In some embodiments, the electrolyte can comprise electrolyte additives, such as vanillin, indium hydroxide, zinc acetate, zinc oxide, cetyltrimethylammonium bromide, sodium dodecyl sulfate, sodium dodecylbenzene sulfonate, polyethylene glycol, ethanol, methanol, zinc gluconate, glucose, or any combination thereof.

In some embodiments, an organic solvent containing a suitable salt can be used as an electrolyte. Examples of suitable organic solvents include, but are not limited to, cyclic carbonates, linear carbonates, dialkyl carbonates, aliphatic carboxylate esters, γ-lactones, linear ethers, cyclic ethers, aprotic organic solvents, fluorinated carboxylate esters, and combinations thereof. Any suitable additives including salts as described herein can be used with the organic solvents to form an organic electrolyte for the anolyte and/or catholyte.

In order to help impregnate the electrodes with the electrolyte, the electrodes can be pre-soaked with the selected electrolyte solution. This can be performed by soaking the electrodes in the electrolyte outside of the battery or housing, and then placing the pre-soaked electrodes into the housing to construct the battery. In some embodiments, an electrolyte can be introduced into the battery to soak the electrodes in-situ. This can include the use of a vacuum to assist in impregnating the electrodes. The electrodes can be soaked for between about 1 minute and 24 hours. In some embodiments, the soaking can be carried out over a plurality of cycles in which the battery is filled with the electrolyte and allowed to soak, drained, refilled and allowed to soak, followed by draining a desired number of times.

Figure 2:
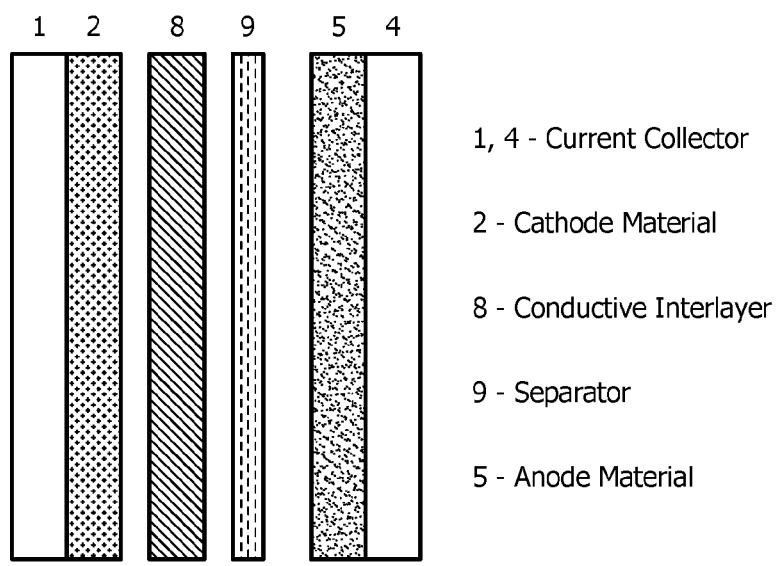
FIG. 2 illustrates placement of battery components for a $MnO_2|Zn$ battery.

In some embodiments, the $MnO_2|Zn$ battery can comprise a conductive interlayer. The conductive interlayer comprises (i) a binder, and (ii) a conductive carbon, a metal hydroxide, a metal oxide, or combinations thereof. In some embodiments, the conductive interlayer can contact the cathode. For example, and as it can be seen in the embodiment in FIG. 2, the conductive interlayer 8 may be adjacent to the cathode material 2. In some embodiments, the conductive interlayer 8 may contact the anode, such as being disposed between in contact with the anode between the anode and the cathode. In some embodiments, multiple conductive interlayers may be present, in contact with the cathode, the anode, or both, and the composition of different conductive interlayers of the plurality of conductive interlayers may be the same or different. FIG. 2 illustrates a possible placement of battery components. When the battery is assembled, the conductive interlayer 8 may be compressed onto (e.g., in contact with, touching, etc.) the cathode material 2.

The binders in the conductive interlayer 8 can comprise any of the binders described herein with respect to the anode material 5 and/or cathode material 2. In some embodiments, the binder used in the cathode material 2 may be the same as the binder used in the conductive interlayer 8. In other embodiments, the binder used in the cathode material 2 may be different from the binder used in the conductive interlayer 8.

In some embodiments, the binder used in the conductive interlayer 8 may comprise polyvinyl alcohol, polyacrylic acid, cellulose, or combinations thereof. In some embodiments, the binders used in the conductive interlayer 8 may comprise a cellulose-based binder, such as methyl cellulose (MC), carboxymethyl cellulose (CMC), hydroypropyl cellulose (HPH), hydroypropylmethyl cellulose (HPMC), hydroxethylmethyl cellulose (HEMC), carboxymethylhydroxyethyl cellulose, hydroxyethyl cellulose (HEC), or any combination thereof; wherein the cellulose-based binder could be cross-linked with a conductive polymers such as polyvinyl alcohol (PVA), polyvinylacetate, polyaniline, polyvinylpyrrolidone, polyvinylidene fluoride, polypyrrole, or combinations thereof.

In some embodiments, poly(vinyl alcohol) (PVA) may be used for forming the conductive interlayer 8. PVA is highly hydrophilic and a good film-forming polymer. PVA consists of a polymer matrix that swells with water and alkaline electrolytes, and thus provides a high ionic conductivity and easy electrolyte accessibility to the electrode. PVA can be cold water soluble, hot water soluble, or cross-linked water insoluble. The PVA molecule in the PVA binder used in the conductive interlayer 8 can vary from a molecular weight as low as 5,000 g/mol to as high as 500,000 g/mol, and its degree of hydrolysis can vary from about 70% to about 99+%.

Nonlimiting examples of metal hydroxides suitable for use in the conductive interlayer of the present disclosure include nickel hydroxide, copper hydroxide, calcium hydroxide, indium hydroxide, bismuth hydroxide, aluminum hydroxide, barium hydroxide, cobalt hydroxide, or any combination thereof.

Nonlimiting examples of metal oxides suitable for use in the conductive interlayer of the present disclosure include copper oxide, nickel oxide, bismuth oxide, indium oxide, or any combination thereof.

The conductive carbon in the conductive interlayer 8 can comprise any of the conductive carbon described herein as a conductive additive with respect to the anode material 5 and/or cathode material 2. Nonlimiting examples of conductive carbon suitable for use in the present disclosure the conductive interlayer 8 include single walled carbon nanotubes, multi-walled carbon nanotubes, graphene, carbon blacks, graphite, or any combination thereof.

The metal hydroxide or metal oxide may be used in the conductive interlayer 8 in some embodiments where the conductive carbon by itself is not enough to limit the dissolution of manganese ions from the cathode material 2. In some embodiments, the metal hydroxide could enhance the conductivity of the conductive interlayer 8 to help increase the operating potential window. The metal oxide used in the conductive interlayer 8 may comprise bismuth oxide, nickel oxide, copper oxide, indium oxide, or combinations thereof. The metal in the metal hydroxide may be selected from the group consisting of nickel, bismuth, indium, barium, copper, calcium, aluminum, and combinations thereof.

In some embodiments, the conductive interlayer 8 may comprise a conductive polymeric membrane having dispersed therein a conductive carbon, a metal hydroxide, a metal oxide, or combinations thereof.

In some embodiments, the conductive interlayer 8 may comprise 1-99 wt. % binder, and 1-99 wt. % conductive carbon, metal hydroxide, metal oxide, or combinations thereof.

The conductive interlayer 8 may be fabricated as a conductive polymeric membrane consisting of primarily polymers with metal hydroxide, metal oxide, conductive carbon, or combinations thereof homogenously distributed therein. The polymeric membrane may comprise polyvinyl alcohol, polyacrylic acid, cellulose, or combinations thereof. The conductive polymeric membrane can be a free-standing membrane layer that is applied separately from the other components of the battery. For example, the cathode, separator, anode, and/or conductive interlayer can each be free-standing, self-supporting films or membranes that can be layered to form the cell.

In some embodiments, the conductive interlayer 8 may be added to or disposed on the cathode 12 in the battery 10 as a layer coated onto the cathode material 2. For a coating of the conductive interlayer 8, the starting conductive interlayer material (e.g., (i) a binder, and (ii) a conductive carbon, a metal hydroxide, a metal oxide, or combinations thereof) may be first dispersed in a solvent to form a dispersion. The dispersion can then be used to coat the cathode 12. Any suitable solvent that can sufficiently solvate the material of the conductive interlayer can be used. In some embodiments, the solvent can be water or organic solvent including but not limited to ethanol, acetone, propanol, butanol, hexane and benzene. The coating process may be carried out by solution casting, spray coating, dip coating, or by using a doctor-blade film coater. The coating process can result in a coating of the dispersion on one or more surfaces of the cathode 12. Once disposed on the cathode 12, the conductive interlayer can be dried to remove the solvent and leave behind the conductive interlayer 8. One or more layering techniques can be used to obtain the desired conductive interlayer with a desired thickness.

In some embodiments, the conductive interlayer can be applied as multiple layers. Each conductive interlayer can have the same or a different composition. For example, multiple conductive interlayer can be used in which one layer comprises a conductive carbon as described herein, and a second layer can comprise a metal hydroxide and/or a metal oxide.

In some embodiments, the conductive interlayer can have a thickness of from about 1 μm to about 1 mm.

Once the battery is formed having at least one conductive interlayer disposed therein, the battery 10 can then be used in a primary or secondary battery. When used as a secondary battery, the battery 10 can be cycled during use by being charged and discharged. The cell can be cycled using any suitable cycling protocols. In some embodiments, the battery can be cycled under constant current conditions or a constant current cycling protocol. The use of a constant current cycling protocol can allow the cell to operate over a large voltage range than a typical constant voltage cycling protocol.

The conductive interlayer 8 may advantageously help with increasing the operating voltage window of the battery, limiting manganese dissolution, limiting inactive-phase formations to allow accessing high depth of discharge manganese dioxide, or combinations thereof.

EXAMPLES

The subject matter having been generally described, the following examples are given as particular aspects of the disclosure and are included to demonstrate the practice and advantages thereof, as well as preferred aspects and features of the inventions. It should be appreciated by those of skill in the art that the techniques disclosed in the examples which follow represent techniques discovered by the inventors to function well in the practice of the inventions, and thus can be considered to constitute preferred modes for its practice. However, those of skill in the art should, in light of the present disclosure, appreciate that many changes can be made in the specific aspects which are disclosed and still obtain a like or similar result without departing from the scope of the inventions of the instant disclosure. It is understood that the examples are given by way of illustration and are not intended to limit the specification of the claims to follow in any manner.

Example 1

An alkaline Zn/MnO$_2$ battery was assembled and tested as follows. A cathode comprising 80 wt. % EMD, 16 wt. % high surface area (5-30 m$^2$/g) graphite and 4 wt. % TEFLON was rolled and pressed onto a nickel current collector. The cathode weight was 62.64 g with a thickness of 0.082 in. An anode comprising 85 wt. % Zn, 10 wt. % ZnO and 5 wt. % TEFLON was rolled and pressed onto a copper current collector. The anode weight was 45 g with 0.025 in thickness. The battery was cycled between 1 and 2 V in 25 wt. % KOH and configured to access 30% of 1$^{st}$ electron capacity of MnO$_2$, which is ~4.45 Ah. The zinc anode utilization was 14%. The conductive layer used comprised 66 wt. % nickel hydroxide, 30 wt. % KS-44 (graphite available as Timrex KS-44 from Timcal SA of Switzerland) and 4 wt. % TEFLON; wherein the conductive layer contacted the cathode.

Figure 3A:
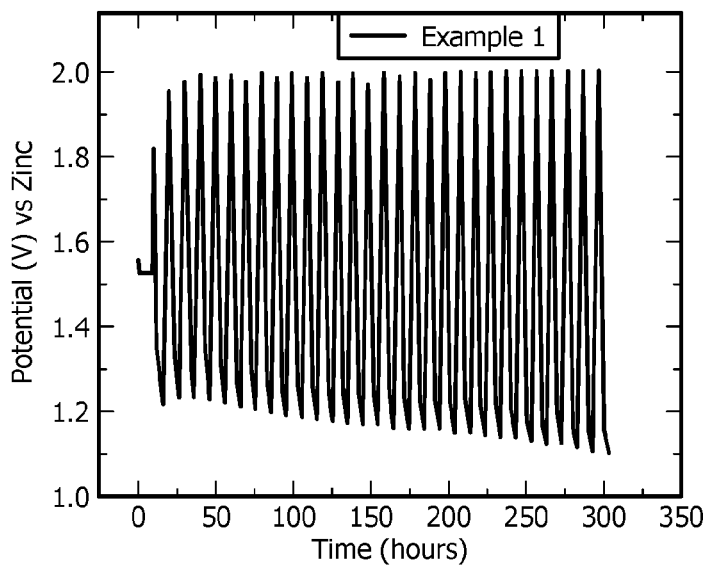
FIG. 3A-3C illustrate performance testing curves of a $MnO_2|Zn$ battery according to Example 1.
Figure 3B:
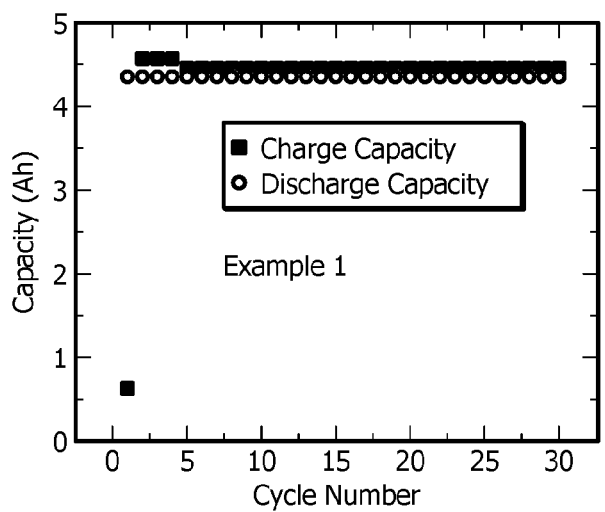
Figure 3C:
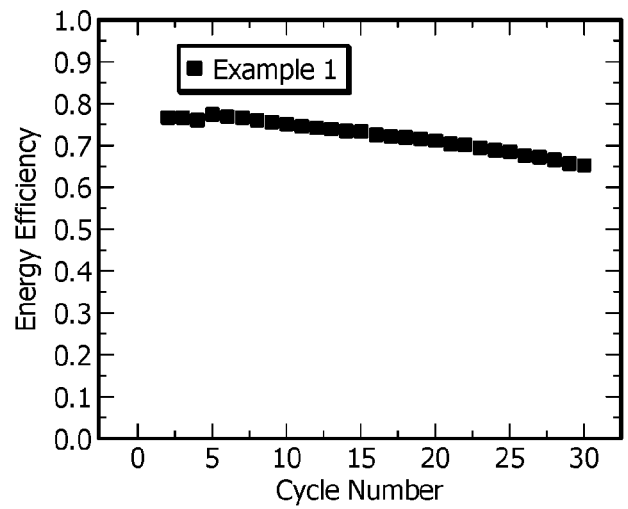

The cycling characteristics of the alkaline Zn/MnO$_2$ battery of Example 1 are shown in FIG. 3A-3C. FIG. 3A displays the potential vs. time curve for the battery of Example 1. FIG. 3B displays the charge and discharge capacity for the battery of Example 1. FIG. 3C displays the energy efficiency for the battery of Example 1. The cell operates in constant current mode with a larger operating voltage window through its cycle life, as shown in FIG. 3A. A constant current mode is essential for successful cycling of Zn anodes as it leads to better plating efficiency. In conventional (normal) cells, where the cycling is set between 1 and 1.65 V, the voltage limits are usually hit triggering a constant voltage cycling protocol which may lead to poor zinc plating efficiencies and hence, zinc failure. The zinc in the conventional cells usually operate at 1-6% utilization, which reduces the energy density of the cell. The larger voltage window in Example 1 leads to higher Zn utilization and hence, a highly energy dense battery. The charge and discharge capacity is shown in FIG. 3B. The cell cycling is stable even in a larger operating voltage window. Energy efficiencies are also high (68-75%) as shown in FIG. 3C, indicating that there is not much electrolyte gassing.

Example 2

An alkaline Zn/MnO$_2$ battery was assembled and tested as follows. A cathode comprising 80 wt. % EMD, 16 wt. % high surface area (5-30 m$^2$/g) graphite and 4 wt. % TEFLON was rolled and pressed onto a nickel current collector. The cathode weight was 62.46 g with a thickness of 0.082 in. An anode comprising 85 wt. % Zn, 10 wt. % ZnO and 5 wt. % TEFLON was rolled and pressed onto a copper current collector. The anode weight was 45 g with 0.025 in thickness. The total utilization of Zn was around 14%. The battery was cycled between 1 and 2 V in 25 wt. % KOH and configured to access 100% of 1$^{st}$ electron capacity of MnO$_2$, which is ~4.45 Ah. The conductive layer used comprised 95 wt. % KS-44 and 4 wt. % TEFLON; wherein the conductive layer contacted the cathode.

Figure 4A:
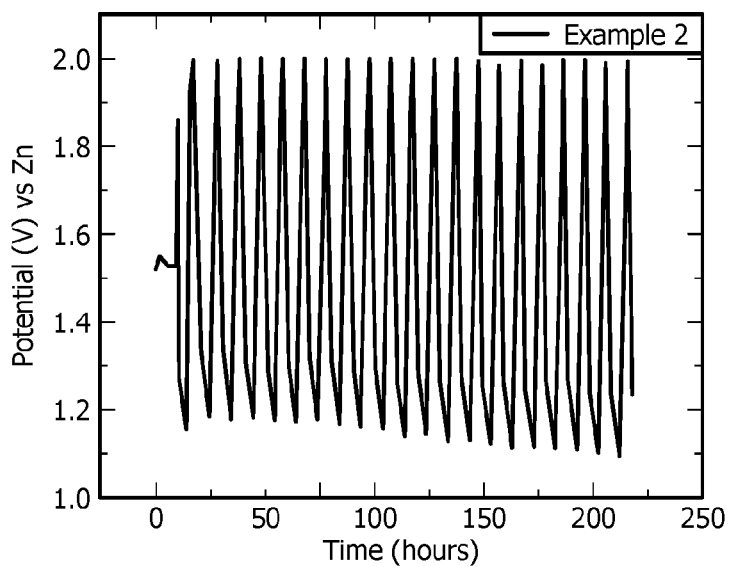
FIG. 4A-4C illustrate performance testing curves of a $MnO_2|Zn$ battery according to Example 2.
Figure 4B:
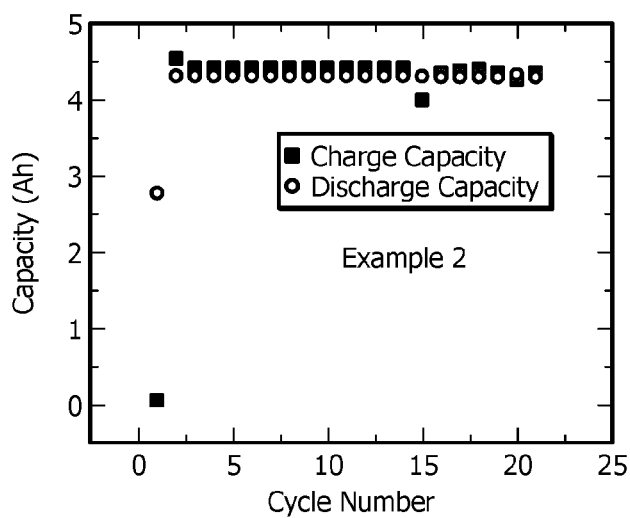
Figure 4C:
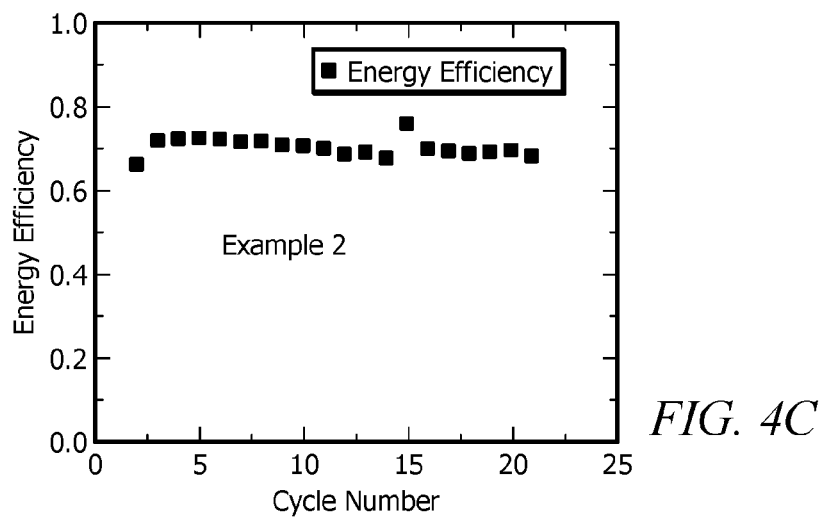

The cycling characteristics of the alkaline Zn/MnO$_2$ battery of Example 2 are shown in FIG. 4A-4C. FIG. 4A displays the potential vs. time curve for the battery of Example 2. FIG. 4B displays the charge and discharge capacity for the battery of Example 2. FIG. 4C displays the energy efficiency for the battery of Example 2. The cell mostly operates in constant current mode with a larger operating voltage window through its cycle life as shown in FIG. 4A. The charge and discharge capacity is shown in FIG. 4B. The cell cycling is stable even in a larger operating voltage window. Energy efficiencies are also relatively high (70-72%), as shown in FIG. 4C. The electrolyte was also clear with no indication of manganese ion dissolution. Cycling cells beyond 1.65 V usually results in manganese dissolution as permanganate ions (darkish purplish color); however, no presence of such ions were seen indicating blocking of dissolved ions by the conductive interlayer.

Example 3

An alkaline Zn/MnO$_2$ battery was assembled and tested as follows. A cathode comprising 80 wt. % EMD, 16 wt. % mix of high surface area graphite (5-30 m$^2$/g) and 4 wt. % TEFLON was rolled and pressed onto a nickel current collector. The cathode weight was 20.5 g with a thickness of 0.08 in. An anode comprising 85 wt. % Zn, 10 wt. % ZnO and 5 wt. % TEFLON was rolled and pressed onto a copper current collector. The battery was cycled between 1 and 2 V in 25 wt. % KOH and configured to access 20% of 1$^{st}$ electron capacity of MnO$_2$, which is ~1.01 Ah. The zinc anode utilization was ~6-8%. The conductive interlayer comprising 75 wt. % polyvinyl alcohol and 25 wt. % nickel hydroxide was made by solution casting of an 6 wt. % polyvinyl alcohol aqueous solution with 2 wt. % nickel hydroxide homogeneously dispersed in it.

Figure 5A:
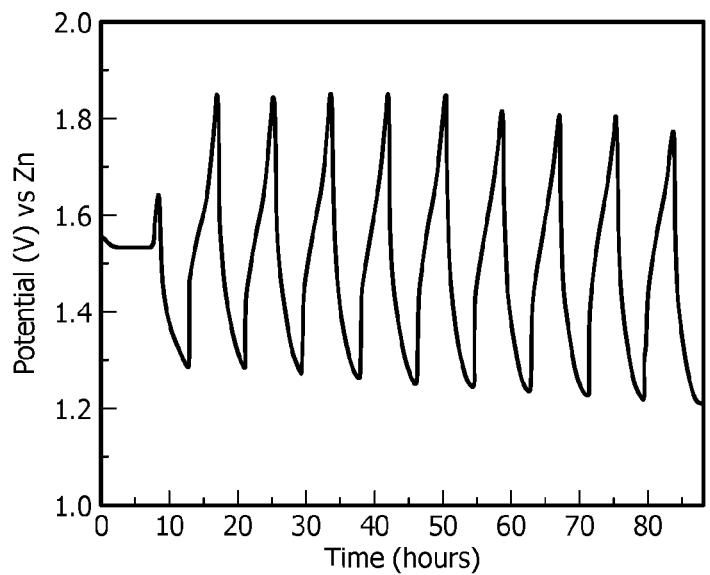
FIG. 5A-5C illustrate performance testing curves of a $MnO_2|Zn$ battery according to Example 3.
Figure 5B:
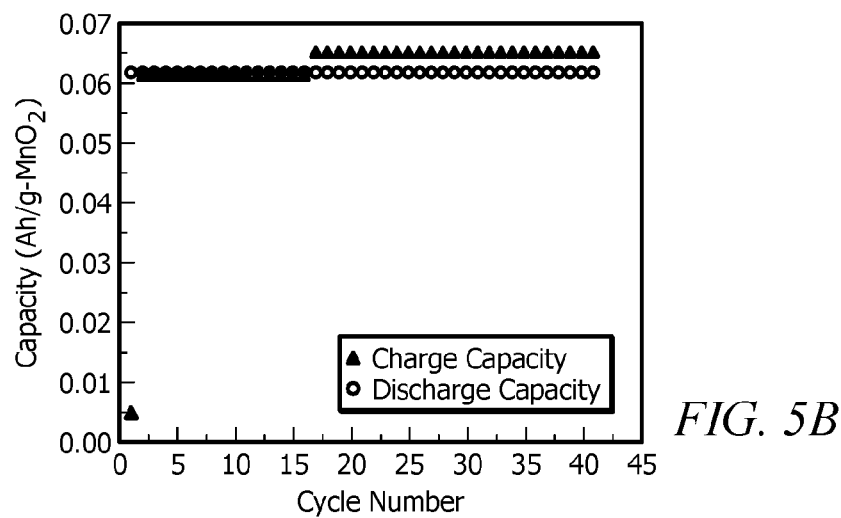
Figure 5C:
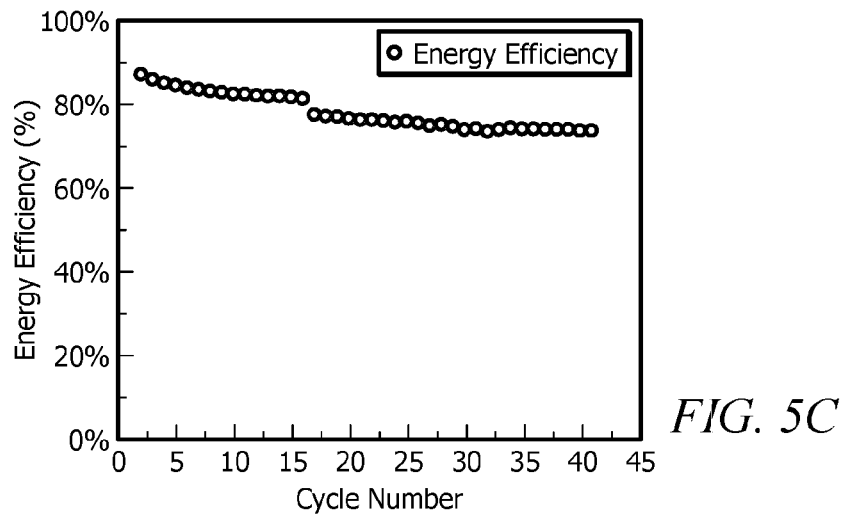

The cycling characteristics of the alkaline Zn/MnO$_2$ battery of Example 3 are shown in FIG. 5A-5C. FIG. 5A displays the potential vs. time curve for the battery of Example 3. FIG. 5B displays the charge and discharge capacity for the battery of Example 3. FIG. 5C displays the energy efficiency for the battery of Example 3. The cell operates in constant current mode with a relatively larger operating voltage window through its cycle life. The voltage curve and current curve of the first 10 cycles are as shown in FIG. 5A. The cell cycling is stable even in a larger operating voltage window, as shown by the charge and discharge capacity curves in FIG. 5B. Energy efficiency is also relatively high (74-80%), as shown in FIG. 5C. By dispersing the metal hydroxides in the polymer matrix, the conductive interlayer became more mechanically stable and flexible. The electrolyte was clear during cycling, indicating no dissolved manganese species coming out from the interlayer to the bulk electrolyte.

Example 4

An alkaline Zn/MnO$_2$ battery was assembled and tested as follows. A cathode comprising 40.77 wt. % electrolytic manganese dioxide (EMD or MnO$_2$), 8.15 wt. % bismuth oxide (Bi$_2$O$_3$), 32.6 wt. % carbon nanotubes (CNT) and the remaining weight balance elemental copper was constructed. This cell was configured to cycle 100% of the 2$^{nd}$ electron capacity. The EMD gets converted into the birnessite phase after the 1$^{st}$ complete discharge and complete recharge to its charged state. The birnessite phase of the MnO$_2$ delivers the capacity for the remaining cycle life of the battery, which could be for primary or secondary purposes. The anodes consisted of 85 wt. % zinc, 10 wt. % zinc oxide and 5 wt. % TEFLON. The total utilization of the Zn electrode was around 13 wt. %. The electrodes were pasted and pressed onto a Ni foil current collector. Three layers of cellophane were wrapped around the MnO$_2$ cathode, and Celgard 5550 and Freudenberg membrane was used to wrap the zinc electrodes. 25 wt. % KOH was used as the electrolyte. The conductive interlayer comprised 66 wt. % nickel hydroxide, 30 wt. % graphite and 4 wt. % TEFLON; wherein the conductive layer contacted the cathode.

Figure 6:
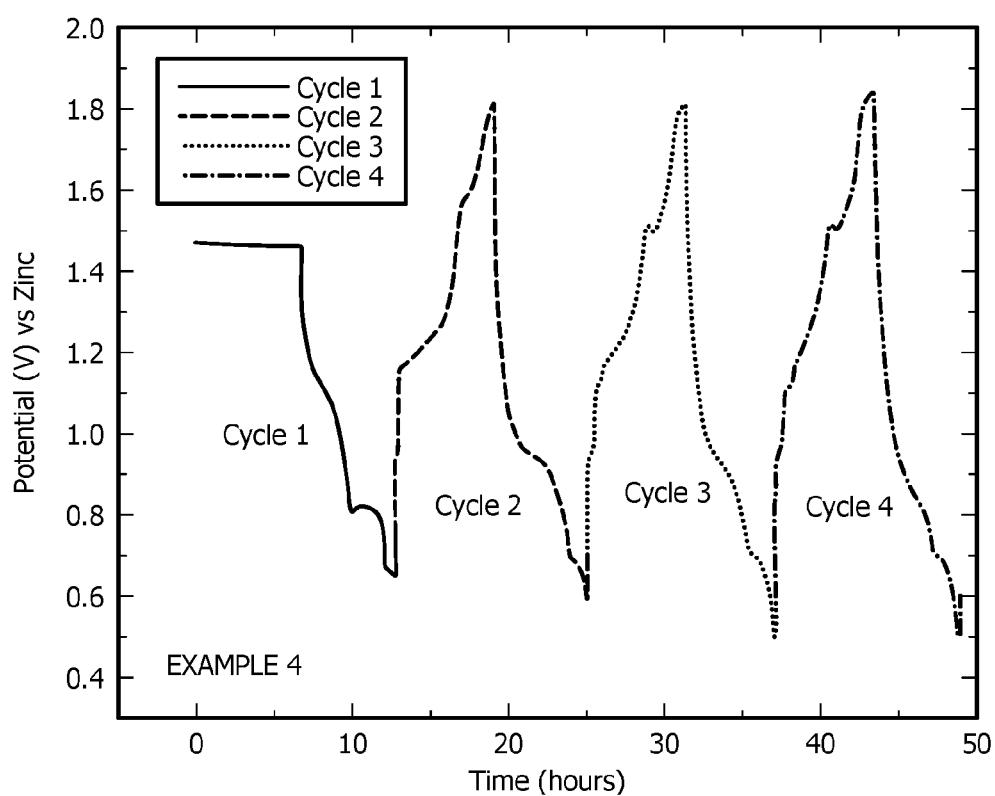
FIG. 6 illustrates an open circuit potential of a $MnO_2|Zn$ battery according to Example 4.

The first four charge-discharge cycles of the alkaline Zn/MnO$_2$ battery of Example 4 are shown in FIG. 6. FIG. 6 displays the potential vs. time curve for the battery of Example 4. The cell is charged and discharged at its full capacity between 1.75 and 0.5 V. The conductive interlayer helps in maintaining the voltage characteristics for a very high areal capacity electrode by limiting the effect of inactive and resistive phases.

Example 5

An alkaline Zn/MnO$_2$ battery was assembled and tested as follows. A cathode comprising of 48.9 wt. % electrolytic manganese dioxide (EMD or MnO$_2$), 9.8 wt. % bismuth oxide (Bi$_2$O$_3$), 22.8 wt. % carbon nanotubes (CNT) and the remaining weight balance elemental copper was constructed. This cell was configured to cycle at 100% of the 2$^{nd}$ electron capacity. The anode consisted of 85 wt. % zinc, 10 wt. % zinc oxide and 5 wt. % TEFLON. The total utilization of the Zn electrode was around 7~10%. The electrodes were pasted and pressed onto a nickel current collector. The zinc electrodes were wrapped with a layer of Freudenberg membrane and two layers of polyvinyl alcohol membrane. The MnO$_2$ cathode was wrapped with two layers of the polyvinyl alcohol/Ni(OH)$_2$ interlayer, which was comprised of 75 wt. % polyvinyl alcohol and 25 wt. % Ni(OH)$_2$. 25 wt. % KOH was used as the electrolyte.

Figure 7A:
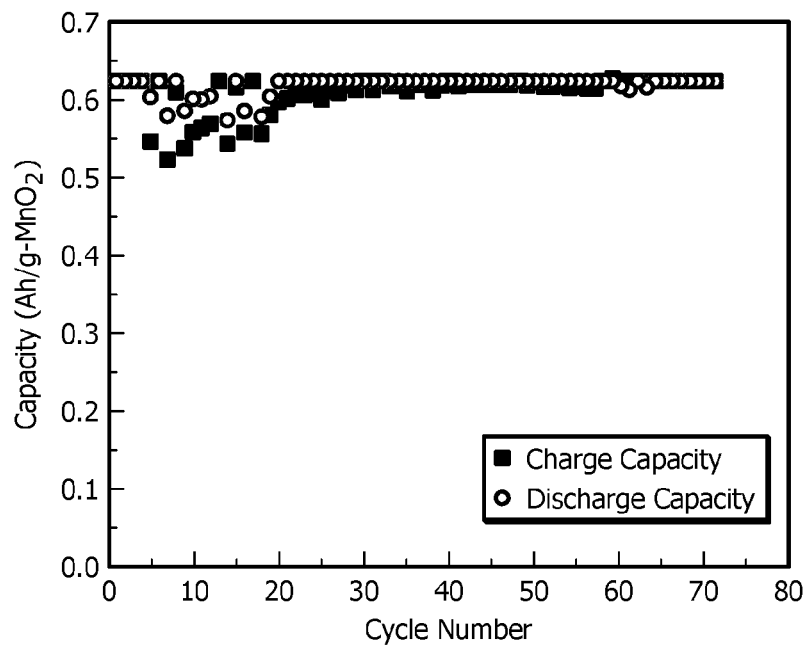
FIG. 7A-7B illustrate performance testing curves of a MnO$_2$|Zn battery according to Example 5.
Figure 7B:
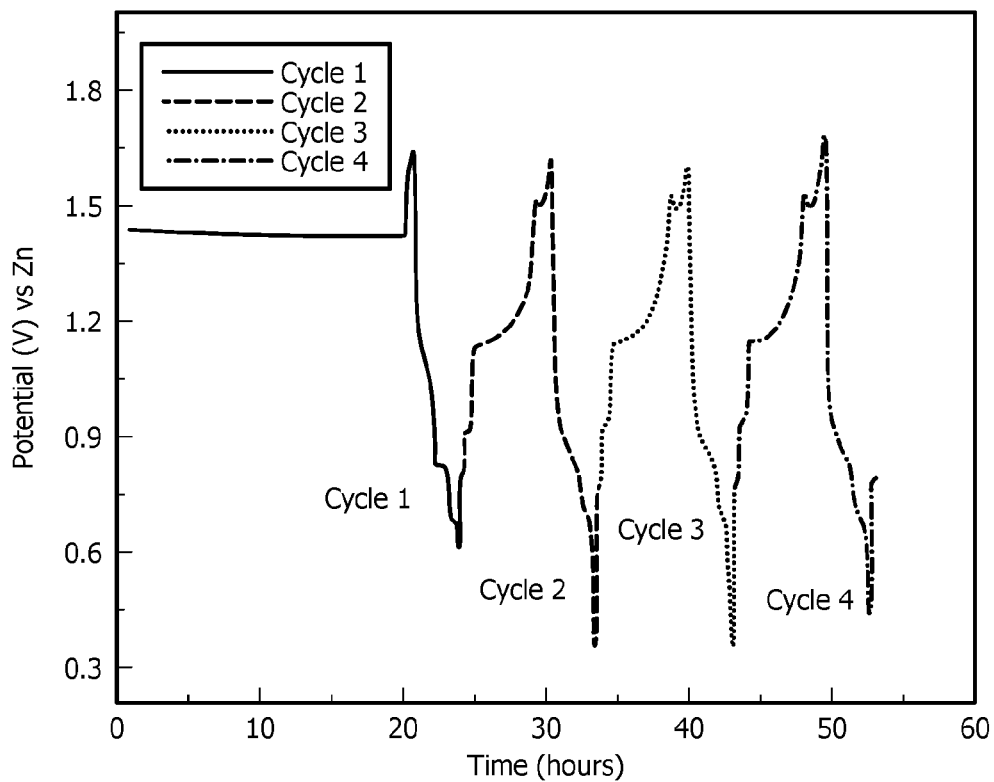

The cell was charged and discharged at its full capacity between 1.75 and 0.35 V, and the resulting data are displayed in FIG. 7A-7B. FIG. 7A displays the charge and discharge capacity for the battery of Example 5. FIG. 7B displays the potential vs. time curve for the battery of Example 5. The cell was cycling stably as represented by the charge and discharge capacity curves in FIG. 7A. The first four charge-discharge cycles are shown in FIG. 7B, which indicates the conductive interlayer's effect in maintaining the voltage characteristics of the cell. The electrolyte was still clear after 70 cycles, indicating blocking of dissolved manganese species by the interlayer.

Example 6

An alkaline Zn/MnO$_2$ battery was assembled and tested as follows. 3 cathodes consisting of the following composition were made: 75 wt. % EMD, 5 wt. % nickel hydroxide, 16 wt % expanded graphite and 4 wt. % Teflon. 4 Zn mesh anodes were prepared with copper tabs welded on a small surface area covering the corner of the mesh. The electrode sizes were 3 in x 6 in. The cathodes and anodes were heat sealed in 1 layer of PVA each. On top of the cathodes a conductive layer comprising 20 wt. % nickel hydroxide, 75 wt. % expanded graphite and 5 wt. % Teflon was placed. The cell was cycled between 1.75 V and 0.8 V at 40% utilization of 1e$^-$ of MnO$_2$ cathode and 20 wt. % utilization of Zn anode. The electrolyte used was 20 wt. % KOH with indium hydroxide in the electrolyte. The C-rate was C/20 where the C is the 1e$^-$ capacity of MnO$_2$.

Figure 8A:
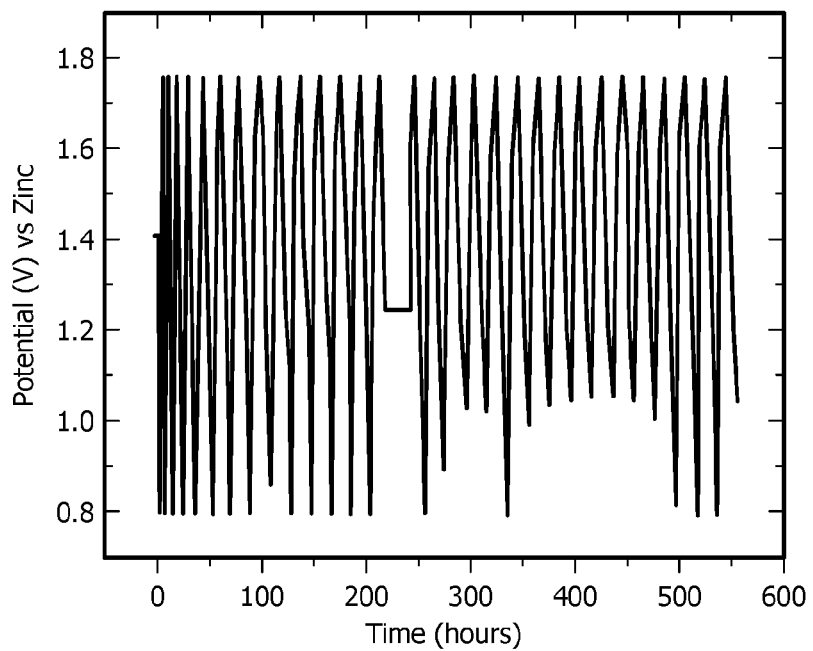
FIG. 8A-8B illustrate performance testing curves of a MnO$_2$|Zn battery according to Example 6.
Figure 8B:
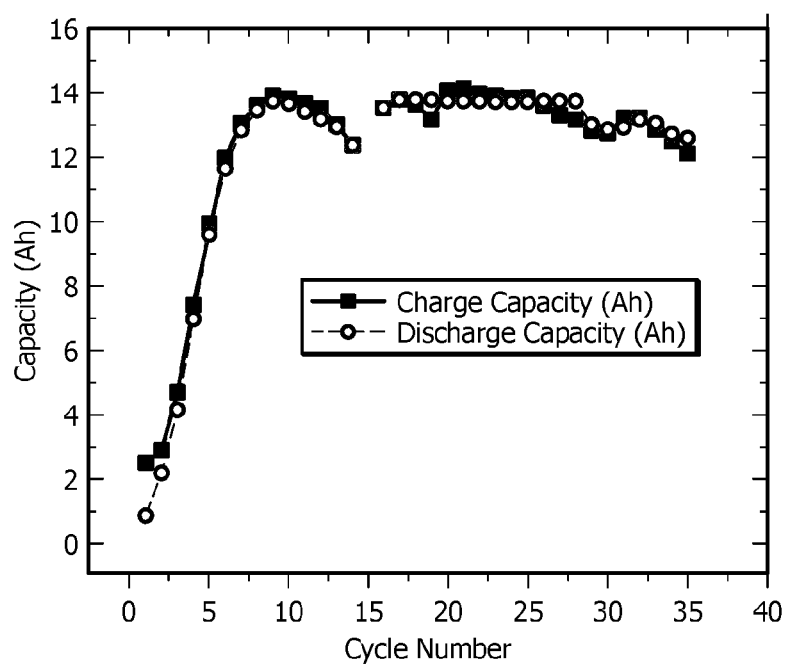

FIG. 8A displays voltage vs. time curves for the battery of Example 6. FIG. 8B displays charge and discharge capacity (Ah) for the battery of Example 6. In FIG. 8A, the voltage vs. time curves of the cell are shown where the cell is cycling stably between the end of charge and discharge potentials. In FIG. 8B, the capacity of the cell is shown where it can be seen that in a few cycles the cell is able to build to 40% utilization of MnO$_2$ and 20% utilization of Zn after which it is cycling stably. This is the first such demonstration of a layering concept at higher utilization of MnO$_2$ and Zn in the 1e$^-$ region of MnO$_2$.

ADDITIONAL DISCLOSURE

The following is provided as additional disclosure for combinations of features and aspects of the presently disclosed subject matter.

A first aspect, which is a primary or rechargeable battery comprising: a housing; an electrolyte disposed in the housing; an anode disposed in the housing; a conductive interlayer disposed in the housing; a cathode disposed in the housing and comprising a cathode to access 20-100% of 1$^{st}$ electron capacity comprising: a manganese dioxide or any of its polymorphs (MnO$_2$); a conductive carbon; and a binder; wherein the conductive interlayer is disposed in the housing compressed on the cathode; wherein the conductive interlayer comprises a conductive carbon; or a conductive carbon and metal hydroxide or metal oxide; or a metal hydroxide or metal oxide; and a binder.

A second aspect, which is a primary or rechargeable battery comprising: a housing; an electrolyte disposed in the housing; an anode disposed in the housing; a conductive interlayer disposed in the housing; a cathode disposed in the housing and comprising a cathode to access 50-100% of 2$^{nd}$ electron capacity comprising: a manganese dioxide or any of its polymorphs (MnO$_2$); a bismuth or bismuth-based compound and copper or copper-based compound to access a higher depth of discharge; and a conductive carbon coated with a metallic layer; and a binder; wherein the conductive interlayer is disposed in the housing compressed on the cathode; wherein the conductive interlayer comprises a conductive carbon; or a conductive carbon and metal hydroxide or metal oxide; or a metal hydroxide or metal oxide; and a binder.

A third aspect, which is the battery of any of the first and second aspects, wherein the anode material is primarily zinc metal or zinc powders or zinc powders mixed with zinc oxide and binder.

A fourth aspect, which is the battery of any of the first and second aspects, wherein the manganese dioxide is alpha-manganese dioxide, beta-manganese dioxide, gamma-manganese dioxide, lambda-manganese dioxide, epsilon-manganese dioxide, delta-manganese dioxide (or birnessite), chemically modified manganese dioxide, ramsdellite, electrolytic manganese dioxide (EMD), and combinations thereof.

A fifth aspect, which is the battery of the second aspect, wherein the birnessite polymorph of manganese dioxide can be synthesized ex-situ or in-situ by completely discharging and charging the EMD to access higher depth of discharge of the 2$^{nd}$ electron capacity.

A sixth aspect, which is the battery of the second aspect, wherein the cathode comprises of bismuth or bismuth-based compounds.

A seventh aspect, which is the battery of the sixth aspect, wherein the bismuth-based compound is bismuth oxide.

An eighth aspect, which is the battery of the second aspect, wherein the cathode comprises of copper or copper-based compounds.

A ninth aspect, which is the battery of the eighth aspect, wherein the copper-based compound is copper aluminum oxide, copper (I) oxide and copper (II) oxide.

A tenth aspect, which is the battery of the eighth aspect, wherein the copper is in powder form, metallic form fabricated as a mesh, foil, wire, ingot, or any shape and form.

An eleventh aspect, which is the battery of any of the first and second aspects, wherein the binder comprises a polytetrafluoroethylene, a cellulose-based hydrogel, polyvinyl alcohol, or a combination thereof.

A twelfth aspect, which is the battery of the eleventh aspect, wherein the binder is a cellulose-based hydrogel selected from the group consisting of methyl cellulose (MC), carboxymethyl cellulose (CMC), hydroxypropyl cellulose (HPC), hydroxypropylmethyl cellulose (HPMC), hydroxyehtylmethyl cellulose (HEMC), carboxymethylhydroxyethyl cellulose, and hydroxyethyl cellulose (HEC).

A thirteenth aspect, which is the battery of the eleventh aspect, wherein the binder is a cellulose-based hydrogel crosslinked with a copolymer selected from the group consisting of polyvinyl alcohol, polyvinylacetate, polyaniline, polyvinylpyrrolidone, polyvinylidene fluoride, and polypyrrole.

A fourteenth aspect, which is the battery of any of the first and second aspects, wherein the conductive carbon is TIMREX Primary Synthetic Graphite (all types), TIMREX Natural Flake Graphite (all types), TIMREX MB, MK, MX, KC, B, LB Grades (examples, KS15, KS44, KC44, MB15, MB25, MK15, MK25, MK44, MX15, MX25, BNB90, LB family) TIMREX Dispersions; ENASCO 150G, 210G, 250G, 260G, 350G, 150P, 250P; SUPER P, SUPER P Li, carbon black (examples include Ketjenblack EC-300J, Ketjenblack EC-600JD, Ketjenblack EC-600JD powder), acetylene black, carbon nanotubes (single or multi-walled), graphene, graphyne, graphene oxide, Zenyatta graphite, and combinations thereof.

A fifteenth aspect, which is the battery of any of the first and second aspects, wherein the metal hydroxide or metal oxide is nickel hydroxide, copper hydroxide, calcium hydroxide, copper oxide, nickel oxide, bismuth oxide, indium oxide, indium hydroxide, aluminum hydroxide, barium hydroxide, cobalt hydroxide, or any combination thereof.

A sixteenth aspect, which is the battery of any of the first, second and fifteenth aspects, wherein the conductive interlayer could be fabricated as a conductive polymeric membrane consisting of primarily polymers with homogenously distributed metal hydroxide or carbon or combinations thereof.

A seventeenth aspect, which is the battery of any of the first, second, fifteenth and sixteenth aspects, wherein the polymer could be polyvinyl alcohol, polyacrylic acid, cellulose or combinations thereof.

An eighteenth aspect, which is the battery of the first aspect, wherein the cathode is comprised of 50-90 wt. % manganese dioxide, 10-50 wt. % conductive carbon and 0-10 wt. % binder.

A nineteenth aspect, which is the battery of any of the second aspect, wherein the cathode is comprised of 1-90 wt. % manganese dioxide, 0-30 wt. % bismuth or bismuth-based compounds, 0-50 wt. % copper or copper-based compounds, 1-90 wt. % conductive carbon, and 0-10 wt. % binder.

A twentieth aspect, which is the battery of any of the first and second aspects, wherein the conductive interlayer is comprised of 0-99 wt. % carbon, 0-99 wt. % metal hydroxide, and 1-99 wt. % binder.

A twenty-first aspect, which is the battery of any of the first and second aspects, wherein the battery can be used as single-discharge or multiple charge-discharge cycles.

A twenty-second aspect, which is the battery of any of the first, second, sixteenth and twentieth aspects, wherein the conductive interlayer helps in increasing the operating voltage window, limiting manganese dissolution, limiting inactive-phase formations to allow accessing high depth of discharge manganese dioxide.

A twenty-third aspect, which is the battery of any the first aspect, wherein the cathode has a porosity between 5-95%.

A twenty-fourth aspect, which is the battery of the first aspect, wherein further comprising a current collector for the cathode or the anode, the current collector selected from the group consisting of a copper mesh, a copper foil, a nickel mesh, a nickel foil, a copper plated nickel mesh or foil, and a nickel-plated copper mesh or foil.

A twenty-fifth aspect, which is the battery of the first aspect, wherein the cathode is formed by pressing electrode material on to a current collector at 1,000-20,000 psi.

A twenty-sixth aspect, which is the battery of the first aspect, wherein the electrolyte comprises an alkaline hydroxide selected from the group consisting of sodium hydroxide, potassium hydroxide, cesium hydroxide, rubidium hydroxide, lithium hydroxide or a combination thereof.

A twenty-seventh aspect, which is the battery of the first aspect, further comprising a polymeric separator between the anode and the cathode.

A twenty-eighth aspect, which is a battery comprising: a battery housing; a cathode comprising a cathode electroactive material; an anode comprising an anode electroactive material; an electrolyte; and a conductive interlayer; wherein the cathode, the anode, the electrolyte, and the conductive interlayer are disposed within the battery housing; wherein the cathode electroactive material comprises manganese dioxide, polymorphs thereof, or combinations thereof; wherein the cathode is configured to access 20-100% of $1^{st}$ electron capacity of the cathode electroactive material; wherein the conductive interlayer contacts the cathode; and wherein the conductive interlayer comprises (i) a binder and (ii) a conductive carbon, a metal hydroxide, a metal oxide, or combinations thereof.

A twenty-ninth aspect, which is the battery of the twenty-eighth aspect, wherein the battery is a primary battery or a rechargeable battery.

A thirtieth aspect, which is the battery of the twenty-ninth aspect, wherein, when the battery is a primary battery, the battery is used as a single-discharge battery.

A thirty-first aspect, which is the battery of the twenty-ninth aspect, wherein, when the battery is a rechargeable battery, the battery is used as a multiple charge-discharge cycles battery.

A thirty-second aspect, which is the battery of any of the twenty-eighth through thirty-first aspects, wherein the cathode further comprises a conductive carbon and/or a binder; wherein the conductive carbon of the cathode and the conductive carbon of the conductive interlayer are the same or different; and wherein the binder of the cathode and the binder of the conductive interlayer are the same or different.

A thirty-third aspect, which is the battery of any of the twenty-eighth through thirty-second aspects, wherein the manganese dioxide comprises at least one of alpha-manganese dioxide, beta-manganese dioxide, gamma-manganese dioxide, lambda-manganese dioxide, epsilon-manganese dioxide, delta-manganese dioxide (birnessite), chemically modified manganese dioxide, ramsdellite, electrolytic manganese dioxide (EMD), and any combination thereof.

A thirty-fourth aspect, which is the battery of any of the twenty-eighth through thirty-third aspects, wherein the conductive interlayer is compressed on the cathode.

A thirty-fifth aspect, which is the battery of any of the twenty-eighth through thirty-fourth aspects, wherein the binder comprises a polytetrafluoroethylene, a cellulose-based hydrogel, polyvinyl alcohol, or a combination thereof.

A thirty-sixth aspect, which is the battery of the thirty-fifth aspect, wherein the cellulose-based hydrogel comprises at least one of methyl cellulose (MC), carboxymethyl cellulose (CMC), hydroxypropyl cellulose (HPC), hydroxypropylmethyl cellulose (HPMC), hydroxyehtylmethyl cellulose (HEMC), carboxymethylhydroxyethyl cellulose, hydroxyethyl cellulose (HEC), and any combination thereof.

A thirty-seventh aspect, which is the battery of the thirty-fifth aspect, wherein the cellulose-based hydrogel is cross-linked with a polymer selected from the group consisting of polyvinyl alcohol, polyvinylacetate, polyaniline, polyvinylpyrrolidone, polyvinylidene fluoride, polypyrrole, and any combination thereof.

A thirty-eighth aspect, which is the battery of any of the twenty-eighth through thirty-seventh aspects, wherein the conductive carbon comprises TIMREX Primary Synthetic Graphite, TIMREX Natural Flake Graphite, TIMREX MB, MK, MX, KC, B, LB Grades, TIMREX Dispersions; ENASCO 150G, 210G, 250G, 260G, 350G, 150P, 250P; SUPER P, SUPER P Li, carbon black, acetylene black, carbon nanotubes, single wall carbon nanotubes, multi-wall carbon nanotubes, graphene, graphyne, graphene oxide, Zenyatta graphite, or combinations thereof.

A thirty-ninth aspect, which is the battery of any of the twenty-eighth through thirty-eighth aspects, wherein the metal hydroxide comprises at least one of nickel hydroxide, copper hydroxide, calcium hydroxide, indium hydroxide, aluminum hydroxide, barium hydroxide, cobalt hydroxide, and any combination thereof.

A fortieth aspect, which is the battery of any of the twenty-eighth through thirty-ninth aspects, wherein the metal oxide comprises at least one of copper oxide, nickel oxide, bismuth oxide, indium oxide, and any combination thereof.

A forty-first aspect, which is the battery of any of the twenty-eighth through fortieth aspects, wherein the conductive interlayer comprises a polymeric membrane having the conductive carbon, metal hydroxide, metal oxide, or combinations thereof dispersed therein.

A forty-second aspect, which is the battery of any of the twenty-eighth through forty-first aspects, wherein the polymeric membrane comprises polyvinyl alcohol, polyacrylic acid, cellulose, or combinations thereof.

A forty-third aspect, which is the battery of any of the twenty-eighth through forty-second aspects, wherein the conductive interlayer comprises 1-99 wt. % binder, and 1-99 wt. % conductive carbon, a metal hydroxide, a metal oxide, or combinations thereof; based on a total weight of the conductive interlayer.

A forty-fourth aspect, which is the battery of any of the twenty-eighth through forty-third aspects, wherein the conductive interlayer comprises 1-99 wt. % binder, 0-99 wt. % conductive carbon, and 0-99 wt. % metal hydroxide; based on a total weight of the conductive interlayer.

A forty-fifth aspect, which is the battery of any of the twenty-eighth through forty-fourth aspects, wherein the conductive interlayer provides for increasing an operating voltage window of the battery, limiting manganese dissolution, limiting inactive-phase formations to allow accessing high depth of discharge manganese dioxide, or combinations thereof.

A forty-sixth aspect, which is the battery of any of the twenty-eighth through forty-fifth aspects, wherein the cathode comprises a pressed cathode material on a current collector, wherein the current collector comprises carbon, lead, nickel, copper, steel, stainless steel, nickel-coated steel, nickel plated copper, tin-coated steel, copper plated nickel, silver coated copper, copper, magnesium, aluminum, tin, iron, platinum, silver, gold, bismuth, titanium, cold rolled steel, half nickel and half copper, polypropylene, or any combination thereof.

A forty-seventh aspect, which is the battery of the forty-sixth aspect, wherein the current collector is a foil, mesh, perforated foil, foam, felt, fibrous, porous block architecture, honey-combed mesh, sponge-shaped, or any combinations thereof.

A forty-eighth aspect, which is the battery of the forty-sixth aspect, wherein the current collector is selected from the group consisting of: a copper mesh, a copper foil, a nickel mesh, a nickel foil, a copper plated nickel mesh or foil, and a nickel-plated copper mesh or foil.

A forty-ninth aspect, which is the battery of any of the twenty-eighth through forty-eighth aspects, wherein the cathode has a porosity between 5-95%.

A fiftieth aspect, which is the battery of any of the twenty-eighth through forty-ninth aspects, wherein the cathode comprises 50-90 wt. % manganese dioxide, 10-50 wt. % conductive carbon, and 0-10 wt. % binder, based on a total weight of the cathode.

A fifty-first aspect, which is the battery of any of the twenty-eighth through fiftieth aspects, wherein the anode comprises zinc, and wherein the zinc comprises metallic zinc or a zinc powder.

A fifty-second aspect, which is the battery of any of the fifty-first aspect, wherein the zinc powder is mixed with zinc oxide and binder; and wherein the binder of the anode and the binder of the conductive interlayer are the same or different.

A fifty-third aspect, which is the battery of any of the twenty-eighth through fifty-second aspects, wherein the anode comprises at least 50 wt. % zinc, and wherein the zinc comprises metallic zinc or zinc oxide.

A fifty-fourth aspect, which is the battery of any of the twenty-eighth through fifty-third aspects, wherein the anode comprises zinc, iron, aluminum, lithium, magnesium, or combinations thereof.

A fifty-fifth aspect, which is the battery of any of the twenty-eighth through fifty-fourth aspects, wherein the anode electroactive material is a powder, foil, mesh, foam, sponge, perforated foil, or a combination thereof.

A fifty-sixth aspect, which is the battery of any of the twenty-eighth through fifty-fifth aspects, wherein the anode comprises a conductive carbon, wherein the conductive carbon is mixed with the anode electroactive material, and wherein the carbon comprises graphite, carbon fiber, carbon black, acetylene black, single walled carbon nanotubes, multi-walled carbon nanotubes, nickel coated carbon nanotubes, copper coated carbon nanotubes, dispersions of single walled carbon nanotubes, dispersions of multi-walled carbon nanotubes, graphene, graphyne, graphene oxide, and combinations thereof.

A fifty-seventh aspect, which is the battery of any of the twenty-eighth through fifty-sixth aspects, wherein the anode comprises an additive and/or dopant, and wherein the additive and/or dopant comprises bismuth, bismuth oxide, indium, indium oxide, indium hydroxide, cetyltrimethylammonium bromide, sodium dodecyl sulfate, calcium hydroxide, sodium dodecylbenzene sulfonate, polyethylene glycol, zinc oxide, or a combination thereof.

A fifty-eighth aspect, which is the battery of any of the twenty-eighth through fifty-seventh aspects, wherein the anode comprises a pressed anode material on a current collector; and wherein the current collector is selected from the group consisting of: a copper mesh, a copper foil, a nickel mesh, a nickel foil, a copper plated nickel mesh or foil, and a nickel-plated copper mesh or foil.

A fifty-ninth aspect, which is the battery of any of the twenty-eighth through fifty-eighth aspects, wherein the anode comprises 1-100 wt. % of an anode electroactive material, 0-10 wt. % of a conductive carbon, 0-30 wt. % of an additive and/or dopant, and 0-10 wt. % of a binder, based on a total weight of the anode.

A sixtieth aspect, which is the battery of any of the twenty-eighth through fifty-ninth aspects, wherein the electrolyte comprises an alkaline hydroxide selected from the group consisting of sodium hydroxide, potassium hydroxide, cesium hydroxide, rubidium hydroxide, lithium hydroxide, or a combination thereof.

A sixty-first aspect, which is the battery of any of the twenty-eighth through sixtieth aspects, further comprising a polymeric separator disposed between the cathode and the anode.

A sixty-second aspect, which is a battery comprising: a battery housing; a cathode comprising a cathode electroactive material, a conductive carbon coated with a metallic layer, a binder, and an additive and/or dopant; an anode comprising an anode electroactive material; an electrolyte; and a conductive interlayer; wherein the cathode, the anode, the electrolyte, and the conductive interlayer are disposed within the battery housing; wherein the cathode electroactive material comprises manganese dioxide, polymorphs thereof, or combinations thereof; wherein the conductive interlayer contacts the cathode; and wherein the conductive interlayer comprises (i) a binder and (ii) a conductive carbon, a metal hydroxide, a metal oxide, or combinations thereof; wherein the conductive carbon of the cathode and the conductive carbon of the conductive interlayer are the same or different; and wherein the binder of the cathode and the binder of the conductive interlayer are the same or different.

A sixty-third aspect, which is the battery of the sixty-second aspect, wherein the cathode is configured to access 50-100% of $2^{nd}$ electron capacity of the cathode electroactive material.

A sixty-fourth aspect, which is the battery of any of the sixty-second and sixty-third aspects, wherein the additive and/or dopant provides the cathode with ability to access a higher depth of discharge.

A sixty-fifth aspect, which is the battery of any of the sixty-second through sixty-fourth aspects, wherein the additive and/or dopant comprises bismuth, a bismuth compound, bismuth oxide, copper, a copper compound, copper oxide, indium, indium hydroxide, indium oxide, aluminum, aluminum oxide, nickel, nickel hydroxide, nickel oxide, silver, silver oxide, cobalt, cobalt oxide, cobalt hydroxide, lead, lead oxide, lead dioxide, quinones, or a combination thereof.

A sixty-sixth aspect, which is the battery of any of the sixty-second through sixty-fifth aspects, wherein the additive and/or dopant comprises bismuth, a bismuth compound, copper, a copper compound, or any combination thereof.

A sixty-seventh aspect, which is the battery of the sixty-sixth aspect, wherein the bismuth compound comprises bismuth oxide.

A sixty-eighth aspect, which is the battery of the sixty-sixth aspect, wherein the copper compound comprises copper aluminum oxide, copper (I) oxide, copper (II) oxide, or any combination thereof.

A sixty-ninth aspect, which is the battery of the sixty-sixth aspect, wherein the copper is in powder form and/or metallic form fabricated as a mesh, foil, wire, ingot, or any combination thereof.

A seventieth aspect, which is the battery of any of the sixty-second through sixty-ninth aspects, wherein the cathode electroactive material comprises a birnessite polymorph of manganese dioxide; and wherein the birnessite polymorph of manganese dioxide is provided by ex situ synthesis or by in-situ synthesis; and wherein the in-situ synthesis comprises substantially completely discharging and charging the manganese dioxide to access a higher depth of discharge of $2^{nd}$ electron capacity.

A seventy-first aspect, which is the battery of any of the sixty-second through seventieth aspects, wherein the anode comprises zinc, and wherein the zinc comprises metallic zinc or a zinc powder.

A seventy-second aspect, which is the battery of any of the sixty-second through seventy-first aspects, wherein the cathode comprises 1-90 wt. % manganese dioxide, 1-90 wt. % conductive carbon, 0-30 wt. % bismuth and/or a bismuth-based compound, 0-50 wt. % copper and/or a copper-based compound, and 0-10 wt. % binder, based on a total weight of the cathode.

A seventy-third aspect, which is the battery of any of the sixty-second through seventy-second aspects, wherein the conductive interlayer comprises 1-99 wt. % binder, and 1-99 wt. % conductive carbon, a metal hydroxide, a metal oxide, or combinations thereof; based on a total weight of the conductive interlayer.

A seventy-fourth aspect, which is the battery of any of the sixty-second through seventy-third aspects, wherein the conductive interlayer comprises 1-99 wt. % binder, and 0-99 wt. % conductive carbon, and 0-99 wt. % metal hydroxide; based on a total weight of the conductive interlayer.

A seventy-fifth aspect, which is the battery of any of the sixty-second through seventy-fourth aspects, wherein the battery is a primary battery or a rechargeable battery.

A seventy-sixth aspect, which is the battery of any of the sixty-second through seventy-fifth aspects, wherein the metallic layer comprises nickel, copper, tin, aluminum, cobalt, silver, nickel-phosphorous, or combinations thereof.

A seventy-seventh aspect, which is the battery of any of the sixty-second through seventy-sixth aspects, wherein the metal hydroxide comprises at least one of nickel hydroxide, copper hydroxide, calcium hydroxide, indium hydroxide, aluminum hydroxide, barium hydroxide, cobalt hydroxide, and any combination thereof; and wherein the metal oxide comprises at least one of copper oxide, nickel oxide, bismuth oxide, indium oxide, and any combination thereof.

A seventy-eighth aspect, which is a method of forming a battery, the method comprising: combining a binder with a conductive carbon, a metal hydroxide, a metal oxide, or combinations thereof to form a conductive interlayer; disposing the conductive interlayer in contact with a cathode, wherein the cathode comprises a cathode electroactive material comprising manganese dioxide, polymorphs thereof, or combinations thereof; disposing the cathode and the conductive interlayer in a battery housing; disposing an anode in the battery housing; and disposing an electrolyte in the battery housing to form the battery.

A seventy-ninth aspect, which is the method of the seventy-eighth aspect, further comprising disposing a separator between the anode and the cathode within the battery housing.

An eightieth aspect, which is the method of any of the seventy-eighth and seventy-ninth aspects, the manganese dioxide comprises at least one of alpha-manganese dioxide, beta-manganese dioxide, gamma-manganese dioxide, lambda-manganese dioxide, epsilon-manganese dioxide, delta-manganese dioxide (birnessite), chemically modified manganese dioxide, ramsdellite, electrolytic manganese dioxide (EMD), and any combination thereof.

An eighty-first aspect, which is the method of any of the seventy-eighth through eightieth aspects, wherein the anode comprises at least 50 wt. % zinc.

An eighty-second aspect, which is the method of any of the seventy-eighth through eighty-first aspects, wherein the binder is a cellulose-based hydrogel crosslinked with a polymer selected from the group consisting of polyvinyl alcohol, polyvinylacetate, polyaniline, polyvinylpyrrolidone, polyvinylidene fluoride, polypyrrole, and combinations thereof.

An eighty-third aspect, which is the method of any of the seventy-eighth through eighty-second aspects, wherein the cathode is configured to access 20-100% of $1^{st}$ electron capacity of the cathode electroactive material.

An eighty-fourth aspect, which is the method of any of the seventy-eighth through eighty-third aspects, wherein the cathode is configured to access 50-100% of $2^{nd}$ electron capacity of the cathode electroactive material.

An eighty-fifth aspect, which is the method of any of the seventy-eighth through eighty-fourth aspects, wherein the cathode is formed by pressing a cathode material onto a current collector at a pressure between 1,000 psi ($6.9 \times 10^6$ Pascals) and 20,000 psi ($1.4 \times 10^8$ Pascals).

An eighty-sixth aspect, which is the method of any of the seventy-eighth through eighty-fifth aspects, wherein the metal hydroxide comprises at least one of nickel hydroxide, copper hydroxide, calcium hydroxide, indium hydroxide, aluminum hydroxide, barium hydroxide, cobalt hydroxide, and any combination thereof; and wherein the metal oxide comprises at least one of copper oxide, nickel oxide, bismuth oxide, indium oxide, and any combination thereof.

Embodiments are discussed herein with reference to the Figures. However, those skilled in the art will readily appreciate that the detailed description given herein with respect to these figures is for explanatory purposes as the systems and methods extend beyond these limited embodiments. For example, it should be appreciated that those skilled in the art will, in light of the teachings of the present description, recognize a multiplicity of alternate and suitable approaches, depending upon the needs of the particular application, to implement the functionality of any given detail described herein, beyond the particular implementation choices in the following embodiments described and shown. That is, there are numerous modifications and variations that are too numerous to be listed but that all fit within the scope of the present description. Also, singular words should be read as plural and vice versa and masculine as feminine and vice versa, where appropriate, and alternative embodiments do not necessarily imply that the two are mutually exclusive.

It is to be further understood that the present description is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present systems and methods. It must be noted that as used herein and in the appended claims (in this application, or any derived applications thereof), the singular forms "a," "an," and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this description belongs. Preferred methods, techniques, devices, and materials are described, although any methods, techniques, devices, or materials similar or equivalent to those described herein may be used in the practice or testing of the present systems and methods. Structures described herein are to be understood also to refer to functional equivalents of such structures. The present systems and methods will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims may be formulated in this Application or of any further Application derived therefrom, to particular combinations of features, it should be understood that the scope of the disclosure also includes any novel feature or any novel combination of features disclosed herein either explicitly or implicitly or any generalization thereof, whether or not it relates to the same systems or methods as presently claimed in any Claim and whether or not it mitigates any or all of the same technical problems as do the present systems and methods.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new claims may be formulated to such features and/or combinations of such features during the prosecution of the present Application or of any further Application derived therefrom.

What is claimed is:

1. A battery comprising:
   a battery housing;

a cathode comprising a cathode electroactive material, wherein the cathode electroactive material comprises manganese dioxide, polymorphs thereof, or combinations thereof;
an anode comprising an anode electroactive material;
an electrolyte; and
a conductive interlayer, wherein the cathode, the anode, the electrolyte, and the conductive interlayer are disposed within the battery housing, wherein the conductive interlayer is disposed between the anode and the cathode; and wherein the conductive interlayer comprises a conductive carbon, a metal hydroxide, a metal oxide, or combinations thereof, and wherein the conductive interlayer comprises a polymeric membrane having the conductive carbon, metal hydroxide, metal oxide, or combinations thereof dispersed therein.

2. The battery of claim 1, wherein the conductive interlayer contacts the cathode.

3. The battery of claim 1, wherein the cathode further comprises the conductive carbon and/or a binder; wherein the conductive carbon of the cathode and the conductive carbon of the conductive interlayer are the same or different; and wherein the binder of the cathode and the binder of the conductive interlayer are the same or different.

4. The battery of claim 1, wherein the manganese dioxide comprises at least one of alpha-manganese dioxide, beta-manganese dioxide, gamma-manganese dioxide, lambda-manganese dioxide, epsilon-manganese dioxide, delta-manganese dioxide (birnessite), chemically modified manganese dioxide, ramsdellite, electrolytic manganese dioxide (EMD), and any combination thereof.

5. The battery of claim 1, wherein the conductive interlayer is compressed on the cathode.

6. The battery of claim 1, wherein the binder comprises a polytetrafluoroethylene, a cellulose-based hydrogel, polyvinyl alcohol, or a combination thereof.

7. The battery of claim 6, wherein the binder comprises the cellulose-based hydrogel, and wherein the cellulose-based hydrogel comprises at least one of methyl cellulose (MC), carboxymethyl cellulose (CMC), hydroxypropyl cellulose (HPC), hydroxypropylmethyl cellulose (HPMC), hydroxyehtylmethyl cellulose (HEMC), carboxymethylhydroxyethyl cellulose, hydroxyethyl cellulose (HEC), and any combination thereof.

8. The battery of claim 6, wherein the cellulose-based hydrogel is crosslinked with a polymer selected from the group consisting of polyvinyl alcohol, polyvinylacetate, polyaniline, polyvinylpyrrolidone, polyvinylidene fluoride, polypyrrole, and any combination thereof.

9. The battery of claim 1, wherein the conductive carbon comprises TIMREX primary synthetic graphite, TIMREX natural flake graphite, TIMREX MB, MK, MX, KC, B, LB grades, TIMREX dispersions; ENASCO 150G, 210G, 250G, 260G, 350G, 150P, 250P; SUPER P, SUPER P Li, carbon black, acetylene black, carbon nanotubes, single wall carbon nanotubes, multi-wall carbon nanotubes, graphene, graphyne, graphene oxide, Zenyatta graphite, or combinations thereof, wherein the metal hydroxide comprises at least one of nickel hydroxide, copper hydroxide, calcium hydroxide, indium hydroxide, aluminum hydroxide, barium hydroxide, cobalt hydroxide, and any combination thereof.

10. The battery of claim 1, wherein the polymeric membrane comprises polyvinyl alcohol, polyacrylic acid, cellulose, or combinations thereof.

11. The battery of claim 1, wherein the conductive interlayer comprises 1-99 wt. % binder, and 1-99 wt. % conductive carbon, a metal hydroxide, a metal oxide, or combinations thereof; based on a total weight of the conductive interlayer.

12. The battery of claim 1, wherein the conductive interlayer provides for increasing an operating voltage window of the battery, limiting manganese dissolution, limiting inactive-phase formations to allow accessing high depth of discharge manganese dioxide, or combinations thereof.

13. The battery of claim 1, wherein the cathode comprises 50-90 wt. % manganese dioxide, 10-50 wt. % conductive carbon, and 0-10 wt. % binder, based on a total weight of the cathode, and wherein the anode comprises at least 50 wt. % zinc, and wherein the zinc comprises metallic zinc or zinc oxide.

14. The battery of claim 1, wherein the anode comprises zinc, and wherein the zinc comprises metallic zinc or a zinc powder, and wherein the zinc powder is mixed with zinc oxide and a binder.

15. The battery of claim 1, wherein the anode electroactive material is a powder, foil, mesh, foam, sponge, perforated foil, or a combination thereof, and wherein the anode comprises zinc, iron, aluminum, lithium, magnesium, or combinations thereof.

16. The battery of claim 1, wherein the anode comprises at least one of a conductive carbon, an additive or a dopant, wherein the conductive carbon is mixed with the anode electroactive material, and wherein the conductive carbon comprises graphite, carbon fiber, carbon black, acetylene black, single walled carbon nanotubes, multi-walled carbon nanotubes, nickel coated carbon nanotubes, copper coated carbon nanotubes, dispersions of single walled carbon nanotubes, dispersions of multi-walled carbon nanotubes, graphene, graphyne, graphene oxide, and combinations thereof, and wherein the additive or dopant comprises bismuth, bismuth oxide, indium, indium oxide, indium hydroxide, cetyltrimethylammonium bromide, sodium dodecyl sulfate, calcium hydroxide, sodium dodecylbenzene sulfonate, polyethylene glycol, zinc oxide, or a combination thereof.

17. The battery of claim 1, wherein the anode comprises 1-100 wt. % of an anode electroactive material, 0-10 wt. % of a conductive carbon, 0-30 wt. % of an additive and/or dopant, and 0-10 wt. % of a binder, based on a total weight of the anode.

18. The battery of claim 1, wherein the electrolyte comprises an alkaline hydroxide selected from the group consisting of sodium hydroxide, potassium hydroxide, cesium hydroxide, rubidium hydroxide, lithium hydroxide, or a combination thereof.

19. The battery of claim 1, further comprising a polymeric separator disposed between the cathode and the anode.

20. The battery of claim 1, wherein the cathode comprises a conductive carbon coated with a metallic layer, a binder, and an additive or dopant; and
wherein the conductive interlayer contacts the cathode.

21. The battery of claim 20, wherein the additive or dopant comprises: 1) bismuth or a bismuth compound, and 2) copper or a copper compound.

22. The battery of claim 21, wherein the bismuth compound comprises bismuth oxide, and wherein the copper compound comprises copper aluminum oxide, copper (I) oxide, copper (II) oxide, or any combination thereof.

23. The battery of claim 21, wherein the copper is in powder form and/or metallic form fabricated as a mesh, foil, wire, ingot, or any combination thereof.

24. The battery of claim 20, wherein the metallic layer comprises nickel, copper, tin, aluminum, cobalt, silver, nickel-phosphorous, or combinations thereof.

25. A method of forming a battery, the method comprising:
- combining a polymer with a conductive carbon, a metal hydroxide, a metal oxide, or combinations thereof;
- polymerizing the polymer with the conductive carbon, metal hydroxide, metal oxide, or combinations thereof dispersed therein to form a conductive interlayer;
- disposing the conductive interlayer in contact with a cathode, wherein the cathode comprises a cathode electroactive material comprising manganese dioxide, polymorphs thereof, or combinations thereof;
- disposing the cathode and the conductive interlayer in a battery housing;
- disposing an anode in the battery housing; and
- disposing an electrolyte in the battery housing to form the battery.

26. The method of claim 25, further comprising disposing a separator between the anode and the cathode within the battery housing.

27. The method of claim 25, wherein the manganese dioxide comprises at least one of alpha-manganese dioxide, beta-manganese dioxide, gamma-manganese dioxide, lambda-manganese dioxide, epsilon-manganese dioxide, delta-manganese dioxide (birnessite), chemically modified manganese dioxide, ramsdellite, electrolytic manganese dioxide (EMD), and any combination thereof.

28. The method of claim 25, wherein the anode comprises at least 50 wt. % zinc.

29. The method of claim 25, wherein the polymer is a cellulose-based hydrogel crosslinked with a second polymer selected from the group consisting of polyvinyl alcohol, polyvinylacetate, polyaniline, polyvinylpyrrolidone, polyvinylidene fluoride, polypyrrole, and combinations thereof.

30. The method of claim 25, further comprising: cycling the battery under a constant current protocol.

31. The method of claim 25, wherein the metal hydroxide comprises at least one of nickel hydroxide, copper hydroxide, calcium hydroxide, indium hydroxide, aluminum hydroxide, barium hydroxide, cobalt hydroxide, and any combination thereof; and wherein the metal oxide comprises at least one of copper oxide, nickel oxide, bismuth oxide, indium oxide, and any combination thereof.

32. A battery comprising:
- a battery housing;
- a cathode comprising a cathode electroactive material, wherein the cathode electroactive material comprises manganese dioxide, polymorphs thereof, or combinations thereof;
- an anode comprising an anode electroactive material;
- an electrolyte; and
- a conductive interlayer, wherein the cathode, the anode, the electrolyte, and the conductive interlayer are disposed within the battery housing, wherein the conductive interlayer is disposed between the anode and the cathode; and wherein the conductive interlayer comprises (i) a binder and (ii) a conductive carbon, a metal hydroxide, a metal oxide, or combinations thereof, and wherein the conductive interlayer comprises a polymeric membrane, and wherein the polymeric membrane comprises polyvinyl alcohol, polyacrylic acid, cellulose, or combinations thereof.

* * * * *